(12) United States Patent
Hu et al.

(10) Patent No.: US 7,774,346 B2
(45) Date of Patent: Aug. 10, 2010

(54) INDEXES THAT ARE BASED ON BITMAP VALUES AND THAT USE SUMMARY BITMAP VALUES

(75) Inventors: Ying Hu, Nashua, NH (US); Timothy Chorma, Nashua, NH (US); Seema Sundara, Nashua, NH (US); Jagannathan Srinivasan, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 458 days.

(21) Appl. No.: 11/215,639

(22) Filed: Aug. 29, 2005

(65) Prior Publication Data

US 2007/0050381 A1 Mar. 1, 2007

Related U.S. Application Data

(60) Provisional application No. 60/711,843, filed on Aug. 26, 2005.

(51) Int. Cl.
*G06F 7/00* (2006.01)

(52) U.S. Cl. .................. 707/745; 707/715; 707/716

(58) Field of Classification Search .................. None
See application file for complete search history.

(56) References Cited

U.S. PATENT DOCUMENTS

| 6,023,696 A * | 2/2000 | Osborn et al. ................. 707/3 |
| 6,978,384 B1 * | 12/2005 | Milliken ..................... 726/26 |
| 2002/0059202 A1 * | 5/2002 | Hadzikadic et al. ............ 707/3 |
| 2004/0062208 A1 * | 4/2004 | Brown et al. ................ 370/256 |

\* cited by examiner

*Primary Examiner*—Don Wong
*Assistant Examiner*—Belinda Xue
(74) *Attorney, Agent, or Firm*—Gordon E. Nelson

(57) ABSTRACT

A database management system that has bitmap values in which set bits in a representation of a bitstring specify a set of objects whose definitions are built into the database management system. The database management system further includes user-accessible operations on the bitmap values. The bitmap values are represented by means of a mapping specifier that specifies a range of the set of objects and a representation of a string of bits that has been mapped onto the set of object specified by the range specifier. Objects containing bitmap values may be indexed by means of an index tree that includes summary bitmap values.

34 Claims, 14 Drawing Sheets

Bitmap values mapped onto identifier range 20-29:

Mapping specifier: 20-29    Bitstring: 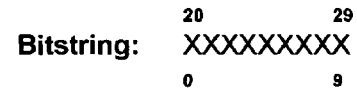 }  303

Bitmap value bitmapval_1    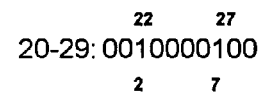 }  305 bitmap-to-set operation bitmap_to_set(bitmapval_1)

result

{object_id(22), object_id(27)}

}  307 set-to-bitmap operation bitmapval_2 := set_to_bitmap({object_id(20),object_id(22), object_id (24)})

result bitmapval_2 = 20-24:10101

}  309 bitmap-to-count operation intval := bitmap_to_count(bitmapval_1)

result intval = 2 intval := bitmap_to_count(bitmapval_2)

result intval = 3

Bitmap values:   bitmapval_1

$$\begin{matrix} & 22 & \phantom{0} & 27 & \\ 20\text{-}29\text{:} & 0010000100 \\ & 2 & \phantom{0} & 7 & \end{matrix}$$

bitmapval_2

$$\begin{matrix} 20 & 22 & 24 \\ 20\text{-}24\text{:}10101 \\ 0 & 2 & 4 \end{matrix}$$

⎫ 403 object exists in bitmap operation intval := object_exists(bitmapval_1,object_id(26))

result intval = 0 intval := object_exists(bitmapval_1, object_id(22))

result intval = 1

⎫ 405 bitmap equals intval := equals(bitmapval_1,set_to_bitmap(
        {object_id(22),object_id(27)}))

result:

intval=1 intval := equals(bitmapval_1, bitmapval_2)

result:

intval=0

Bitmap values:   bitmapval_1   20-29: 0010000100   ⎫
                                                 22     27

2       7

20 22 24 bitmapval_2   20-24: 10101    503

0  2  4 bitmap-AND operation result_bitmap_val := bitmap_and(bitmapval_1, bitmapval_2)    505 result result_bitmap_val = 20-29:0010000000 bitmap-OR operation result_bitmap_val := bitmap_or(bitmapval_1, bitmapval_2)    507 result result_bitmap_val = 20-29:1010100100 bitmap-XOR operation result_bitmap_val := bitmap_xor(bitmapval_1, bitmapval_2)    509 result result_bitmap_val = 20-29:1000100100 bitmap-minus operation result_bitmap_val := bitmap_minus(bitmapval_1, bitmapval_2)    511 result result_bitmap_val = 20-29:0000000100

Bitmap value: bitmapval_1

$$\begin{array}{cc}22 & 27\\0010000100\\2 & 7\end{array}\Big\}\,603$$

bitmap-insert operation bitmap_insert(bitmapval_1, {object_id(28), object_id(33)})

result

$$\begin{array}{ccc}22 & 2728 & 33\\ \text{bitmapval\_1 = 20-33:00100001100001}\\2 & 7\,8 & 13\end{array}\Bigg\}\,605$$

bitmap-delete operation bitmap_delete(bitmapval_1, {object_id(27), object_id(28)})

result

$$\begin{array}{cc}22 & 27\\ \text{bitmapval\_1 = 20-29:0010000000}\\2 & 7\end{array}\Bigg\}\,607$$

|  | Header 803 | General Manager Number 805 | Object Class 807 | Serial Number 809 |
|---|---|---|---|---|
| GID-96 | 8 | 28 | 24 | 36 suffix length 810 |
|  | 0011 0101 (Binary value) | 268.435.456 (Decimal capacity) | 16.777.216 (Decimal capacity) | 68.719.476.736 (Decimal capacity) | prefix 811 / suffix 813

801

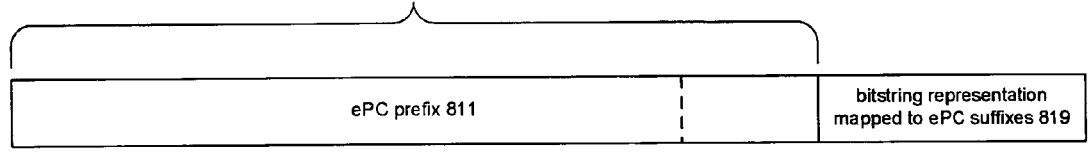

ePC bitmap value 815 mapping specifier prefix 817 / ePC prefix 811 | bitstring representation mapped to ePC suffixes 819

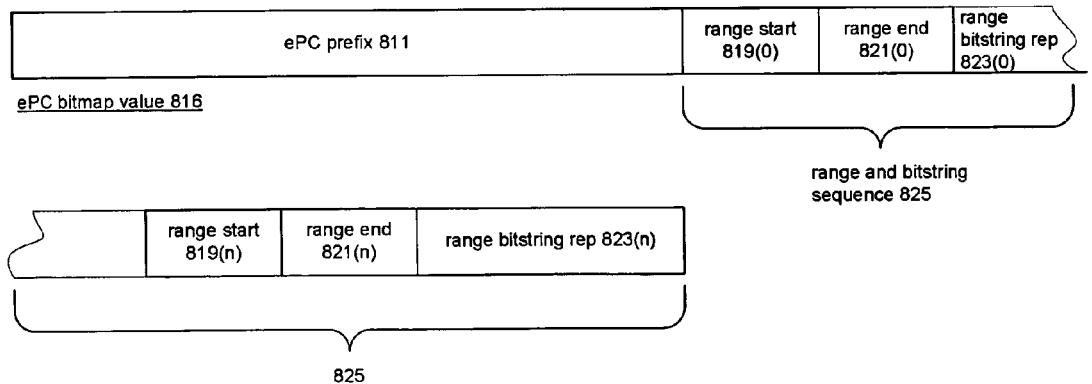

ePC bitmap value 816 ePC prefix 811 | range start 819(0) | range end 821(0) | range bitstring rep 823(0)

range start 819(n) | range end 821(n) | range bitstring rep 823(n)

range and bitstring sequence 825

| data object # 1005 | datafile # 1007 | data block # 1009 | row # 1011 |
|---|---|---|---| rowid 1003

| rowid range start 1023(a) | rowid range end 1025(a) | range bitstring representation 1027(a) | . . . |
|---|---|---|---| mapping specifier 1021(a)

| 1013(n) | 1025(n) | 1027(n) |
|---|---|---| rowid bitmap value 1019

| Row | shelf id | time | map | EPC bitmap |
|---|---|---|---|---|
| 0 | Shelf 1 | T1 | nnn | 1101 0100 1000 1000 |
| 1 | Shelf 1 | T2 | nnn | 1100 0110 0000 1100 |
| 2 | Shelf 1 | T3 | nnn | 1000 0001 0100 0000 |
| ... | .... | ... | ... | ... |
| 15 | Shelf 1 | T16 | nnn | 1000 0100 0101 0100 |
| 16 | Shelf 2 | T1 | nnn | 1000 1111 0101 0010 |
| 17 | Shelf 2 | T2 | nnn | 0000 1111 1100 0001 |
| ... | .... | ... | ... | ... |
| n | Shelf n | ... | ... | 0000 0000 0000 0000 |

1109 — 1103 — 1105 — 1106 — 1107

1111

| RowId | Time | Summary Bitmap | Reference |
|---|---|---|---|
| 0 | T1 | 1101 0100 1000 1000 | 4,8,12 |
| 1 | T2 | 1100 0110 0000 1100 | 5,9,13 |
| 2 | T3 | 1010 0001 0101 0100 | 6,10,14 |
| 3 | T4 | 1000 0100 0101 0100 | 7,11,15 |
| 4 | T1 | 1101 0100 0000 1000 | X1 |
| 5 | T2 | 1000 0110 0000 1100 | X3 |
| 6 | T3 | 1010 0001 0101 0100 | X2 |
| 7 | T4 | 1000 0100 0101 0100 | X7 |
| 8 | T1 | 1100 0100 1000 1000 | X8 |
| 9 | T2 | 0000 0110 0000 1100 | X4 |
| 10 | T3 | 1000 0001 0101 0100 | X5 |
| 11 | T4 | 1000 0100 0101 0100 | X9 |
| 12 | T1 | 1100 0000 1000 1000 | X6 |
| 13 | T2 | 1100 0110 0000 1000 | X11 |
| 14 | T3 | 1000 0001 0101 0000 | X17 |
| 15 | T4 | 1000 0000 0101 0100 | X12 |

1113 — 1115 — 1117 — 1119

1121

| Time_range | Summary_bitmap | RowIDs |
|---|---|---|
| T1 - T10 | 1101 0100 1000 1000 | 0,2,3 |
| T11 - T20 | 1100 0110 0000 1100 | 7,9,11 |
| T21 - T30 | 1010 0001 0100 0000 | 12,13,16 |
| T31 - T40 | 1000 0100 0101 0100 | 1,5,8 |

```
1303 DFS(X, epc):
1305 X: a node in the tree index;
1307 epc: a given epc;
1309 bmp(X): the bitmap associated with node X;

1313 if ( bmapExists(bmp(X), epc)== TRUE)
1315 {
1317   if (X == leaf node)
1319         report bmp(X);
1321   else
1323   {
1325         for each child node V of X do
1327         {
1329             DFS(V, epc);
1331         }
1333   }
1335 }
```

Fig. 13

INDEXES THAT ARE BASED ON BITMAP VALUES AND THAT USE SUMMARY BITMAP VALUES

CROSS-REFERENCE TO RELATED APPLICATIONS

This application claims priority from U.S. provisional patent application 60/711,843, Ying Hu, et al., Supporting RFID-based Item Tracking Applications in Oracle DBMS Using a Bitmap Datatype, filed Aug. 26, 2005. That provisional patent application is also incorporated by reference for all purposes herein. This application also contains the complete Detailed Description and drawings of U.S. application Ser. No. 10/810,756, Ying Hu et al., A database management system with persistent, user-accessible bitmap values, filed Mar. 26, 2004. That application is hereby incorporated into the present application by reference for all purposes. The new material in the Detailed Description of the present application begins with the section titled, Making indexes based on bitmap values.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates generally to database management systems and more particularly to the use of bitmap values in a database management system to represent subsets of a set of objects.

2. Description of Related Art

The following Description of related art will begin with a description of the built-in indexing systems provided by modern database management systems and will then describe how modern database management systems further permit users to define their own kinds of indexing systems for use by the database management system. It finally describes limitations of these techniques that are solved by the persistent, user-accessible bitmap values described in U.S. Ser. No. 10/810,756.

Indexes Generally

Any large collection of information is made much more useful by the inclusion of an index. For example, if a history of the American Revolutionary War has an index and a reader of the history is interested in General Henry Knox's role in forcing the British to evacuate Boston on Mar. 17, 1776, the reader need only look up "Knox, Henry" in the index, where the reader will find a list of the pages in the history book on which General Knox is mentioned. Without the index, the reader would have to scan large portions of the book to find what he or she was looking for. In the terms used in the following discussion, the history of the American Revolution defines a set of information; often a reader of the history is interested only in a portion of that set of information; the portion is termed a subset of the information. Thus, what the history's index does is specify the locations of subsets of the information and thereby speed up the user's access to the indexed subsets.

Built-In Indexing Systems

Database management systems exist to manage and provide access to large collections of information, and as one would expect, database management systems have indexes. In relational database management systems, the collections of information are organized as tables. A database table has a number of columns and may have a number of rows. Each row has a field corresponding to each column. The value of the field corresponding to a column has the kind of value required for the column. For example, the following simple table Employees has four columns and two rows:

| Rowid | Name | Gender | Job_Title |
|---|---|---|---|
| 1 | Smith | F | Manager |
| 2 | Jones | M | Laborer |

Each row represents an employee. The column Rowid is a built-in column whose fields contain a database-system assigned row identifier for each row in the table. The row identifier uniquely identifies the row in the database management system. The fields corresponding to the column Name contains the name of the employee represented by the row. The fields corresponding to Gender contain the employee's biological gender; the fields corresponding to Job_Title, finally, contain the employee's job title. To obtain information from the table, the user provides a query to the database management system which describes the rows from which information is to be fetched and the information to be fetched from those rows. For example, the query SELECT Name FROM Employees WHERE Job_Title=Manager selects the row from Employees whose job title field has the value Manager, that is, the row whose rowid is 1, and returns the value of the Name field from that row, that is, Smith. In terms of the introductory discussion, the query specifies a subset of the set of information contained in Employees and returns the specified subset.

While making an index for Employees is hardly worthwhile, one can be made. Indeed, if Employees were a 10,000 row table, making an index would definitely be worth while. For example, an index by the values of the Name column on Employees would look like this: Jones, 2; Smith, 1. The index has the names in alphabetical order and each name is followed by the rowid for the row the name occurs in. Modern database management systems such as the Oracle 9i® database management system produced by Oracle Corporation, Redwood City, Calif. contain a built-in indexing facility which permits users to specify indexes like the name index in the above example. A specification for such an index in the database management system looks like this:

CREATE INDEX employee_name_index ON Employees (Name)

In response to the specification, the database management system creates the index, updates the index when the table to which it belongs changes, and uses the index to speed up queries on the table. For example, given the above index and the query SELECT Job_Title FROM Employees WHERE Name=Smith the database management system would use the index to determine that the row for Smith was row 1, instead of reading down the table until it found the row whose Name field had the value Smith. The use of the index in the query is thus exactly analogous to its use by the human reader of the history book.

One of the kinds of indexes produced by modern database management systems is a bitmap index. A bitmap is a sequence of bits which has been mapped to a set of objects. Each bit corresponds to one of the objects in the set. A bitmap value is a bitmap in which bits have been set to specify a subset of the set of objects. When an object belongs to the subset, the bit corresponding to the object in the bitmap value is set. In the bitmap indexes used in modern database management systems, the bitmap has been mapped to the set of rowids representing the rows in a table. For example, there are two rows in the table Employees, so the set of rowids has two members and the bitmap has two bits. In our example, the first bit of the bitmap is mapped to rowid 1 and the second to rowid 2. Because each bit in the bitmap is mapped to a rowid in the table, bitmap values can be used as indexes into the table. For instance, a bitmap value that represents a set of rowids in the table Employees can be used to indicate all rows in the table that have the value M in the Gender field. In such a bitmap value, the bit representing a given rowid of the table has the value 1 when M is present in the row's Gender field and otherwise 0. The example bitmap value for the value M in the Gender field in Employees is 0,1. The value M is termed the key of the bitmap value. To locate the row with the value M, the database management system consults the bitmap value for that key and determines from the fact that the 1 is the second bit in the bitmap value that the row with the value is the row having rowid 2.

The Oracle 9i database management system permits the user to specify that a bitmap index be created for a column of a table. The database management system responds to such a specification by making a bitmap index that includes a bitmap value for each possible value of the fields of the column. For example, fields in the Gender column may have only two values: M and F. Thus, for this column, the database management system would build two bitmap values, one for the key M and the other for the key F. A specification that would cause the Oracle 9i database management system to build such and index is the following:

CREATE BITMAP INDEX Gender_index ON Employees (Gender)

The bitmap value for the M key is 0,1, as set forth above; the bitmap value for the F key is 1,0. The bitmap value for the M key thus specifies the subset of the rows of the table Employees that contains the row having rowid 2, while the bitmap value for the F key specifies the subset that contains the row having rowid 1.

The advantages of the bitmap index are that it takes up very little space and that logical operations such as AND, OR, and NOT in queries can be performed very rapidly on fields with bitmap indexes by performing the logical operations on the bitmap values. For example, the query SELECT Name FROM Employees WHERE Gender='M' OR Gender='F' would OR the bitmap value for Gender whose key is M, namely 1,0, with the bitmap value for Gender whose key is F, namely 0,1, to produce the bitmap value 1,1, which specifies that every row in Employees is to be selected. The built-in indexing systems provided by the Oracle 9i database management system are described in detail beginning at the section Indexes on page 10-28 of *Oracle 9i Database Concepts*, Release 2, published by Oracle Corporation in 2002 and available from Oracle Corporation as part number A96524-01. The description is incorporated into the present patent application by reference.

User-Defined Indexing Systems

In the database management systems for which the built-in indexing systems were designed, the values contained in the fields of the database management system's tables had to belong to one of a small number of built-in data types. The built-in data types typically included character data types for names and words, decimal data types for decimal numbers, integer data types for whole numbers, and data types of system values used in the database management system's metadata, that is, the data which defines the tables. In the example table Employees, the rowids are such system data. The data in the other fields has character data types. More recently, database management systems have included arrangements which permit the user to define his or her own data types and use values having those data types in fields in the database management system's tables. The user-defined data types are employed in a domain in which the user is interested. For example, a user interested in photographs might define data types suitable for that domain. An example would be a data type Photograph. At a minimum, the definition of Photograph specifies how values of type Photograph are represented in the database management system. The definition can also specify operations that may be performed on values of the type. For instance, if the domain requires that photographs be compared, the definition may specify a Like operation that compares two photographs and returns a result that is a measure of similarity. Finally, the definition can specify an indexing system for values of type Photograph. To do this, the user must specify how the index is defined, how it is maintained, and how it is read. The mechanisms used for defining user-defined types and operations on them in the Oracle 9i database management system are described in *Oracle 9i Data Cartridge Developer's Guide*, Release 2 (9.2), Part No. A96595-01, available from Oracle Corporation. The discussion of user-defined indexing is contained in Chapter 7, *Building Domain Indexes*. The entire reference is hereby incorporated into the present application by reference.

Limitations of Built-In and User-Defined Indexing Systems

The built-in indexing systems are easy to use and efficient, but the number of kinds of indexes is limited. For example, the Oracle 9i database management system currently provides the following built-in indexing schemes:

B-tree indexes
B-tree cluster indexes
Hash cluster indexes
Reverse key indexes
Bitmap indexes
Bitmap Join Indexes Further, there are certain kinds of built-in data types that cannot be indexed using these indexing schemes and the built-in indexing schemes have only limited use with user-defined types. A final disadvantage of the built-in indexing schemes is that the user has very little control over the manner in which the database management system constructs the indexes and no access to the internal indexing data.

For example, with bitmap indexes, the system always constructs a bitmap for every possible value of the field whose values are being used as keys. The system further requires that the values used as keys are mutually exclusive and that values in the column for which the index is being made belong to system-defined types. There are, however, many situations in which the user is interested in indexes only for certain key values or indexes for overlapping ranges of values or in indexes for user-defined types and the built-in bitmap indexes are simply not useful in those situations. Moreover, the primitive operations that the database management system employs to make and manipulate bitmap values are never accessible to the user. For example, the user cannot make a bitmap value that represents the rowids returned by a user-defined query.

A user can of course make a user-defined indexing system that uses any indexing scheme that is useful for the domain of the data being indexed. The drawback of such a user-defined indexing scheme is that the user must make the considerable effort required to design and program the indexing scheme. One of the things that increases the effort required to design and program such index schemes is the unavailability of indexing primitives to the programmer.

As noted above, bitmap values are used in indexing schemes because they are compact representations of sets of objects. Use of bitmap values in other situations which require compact representations of sets of objects is not possible because programmers using the database management system have access neither to the bitmap values themselves nor to primitive operations for them.

The MySQL open source relational database system has a SET built-in data type which is used to represent sets of up to 64 user-defined objects. A value of the SET type represents a subset of a particular user-defined set of objects, and the subset is represented by a bitmap value which is mapped onto the particular user-defined set of objects and has a bit set for each object that belongs to the subset. MySQL provides primitive operations for values of the SET type, but the limitation of the number of objects in the set to 64 renders MySQL set types useless for applications which require bitmap values that are capable of representing subsets of large sets of objects. One large class of such applications is of course bitmap indexes.

U.S. Ser. No. 10/810,756 describes techniques which give programmers access to bitmap values specifying subsets of large sets of values and to primitive operations for the bitmap values. These techniques greatly increase the number of situations in which bitmap indexes can be employed, permit their use with objects having user-defined classes, and permit the use of bitmap values generally to represent subsets of large sets of objects. The expanded use of bitmap values which has resulted from the use of the techniques of U.S. Ser. No. 10/810,756 has however led to a need to efficiently locate table rows whose bitmap values indicate the presence or absence of an object in the set of objects represented by the bitmap values. It is an object of the invention disclosed herein to provide an indexing technique which permits efficient location of such table rows.

BRIEF SUMMARY OF THE INVENTION

The object of the invention is achieved in one aspect by creating an index tree that employs summary bitmap values. The index tree is stored in a medium, the medium including a device or material used for storing information or data. The index tree has a number of first nodes at a level of a tree. Each of the first nodes contains a bitmap value. A second node at a next higher level of the tree is a parent of the first nodes and contains a summary bitmap value that equals the result of an aggregation operation on bits of the bitmap values contained in the first nodes.

The aggregation functions may include logical OR and logical AND. The second node may be the root node of the index tree. The index tree may index a set of objects that contain bitmap values. The first nodes may be leaf nodes of the index tree. In a leaf node, the bitmap value is a copy of a bitmap value in an object belonging to the set and the leaf node further specifies the object that contains the bitmap value whose copy is in the leaf node. When the summary bitmap value of a node is produced by a logical OR, a set bit indicates that at least one leaf node which is a descendant of the node has the corresponding bit set in the descendant leaf node's bitmap value. When the summary bitmap value of a node is produced by a logical AND, an unset bit indicates that at least one leaf node which is a descendant of the node has the corresponding bit unset in the descendent leaf node's bitmap value.

Each object that contains a bitmap value may further contain a scalar value and the index tree may index a subset of the objects in which all of the objects have equal scalar values. The index tree may also index a subset of the objects in which all of the objects have scalar values which belong to a given range of scalar values.

The set of objects indexed by the index tree may be rows in a first table in a relational database system. The index tree may be an index object in the relational database system.

The first nodes in the index tree may be leaf nodes of the index tree and there may be a plurality of the next higher levels in the index tree. In this case, the summary bitmap value of a given node at a given higher level of the index tree equals the result of an aggregation operation on the bitmap values contained in all of the nodes that are descendants of the given node. The highest level of the tree may be the tree's root node.

Another aspect of the invention is a method of making the index tree of the invention includes the steps of making a number of first nodes at a level of the tree, each first node containing a bitmap value and making a second node at a next higher level of the tree. The second node is a parent of the nodes in the plurality of first nodes and contains a summary bitmap value that equals the result of an aggregation operation on bits of the bitmap values contained in the first nodes. In the step of making a number of first nodes, the first nodes may be additionally divided into one or more disjunct sets. In the step of making the second node, a second node is made for each of the disjunct sets, with the second node corresponding to a disjunct set being a parent of the nodes in the corresponding disjunct set. The steps of the method may be repeated until the parent node is the index tree's root node.

A further aspect of the invention is a method of traversing the index tree of the invention. The method includes the following steps: (1) in a parent node of the index tree, determining whether a given bit of the parent node's summary bitmap is set to a value that indicates further traversal of the index tree; (2) If the given bit is so set and the child nodes are internal nodes, performing step (1) in each of the parent's child nodes; and continuing to perform steps (1) and (2) as long as the given bit in the child node's summary bit map is set to the value that indicates further traversal. The method may additionally include the step performed when the child node is a leaf node of determining the value of the bit in the leaf node's bitmap that corresponds to the given bit.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 3 shows conversion operations that may be performed on bitmap values;

FIG. 4 shows an object-exists operation that may be performed on bitmap values;

FIG. 5 shows logical operations that may be performed on bitmap values;

FIG. 6 shows operations for inserting bits representing objects into bitmap values and deleting bits representing objects from bitmap values;

FIG. 8 shows electronic product codes and bitmap values representing sets of electronic product codes;

FIG. 10 shows rowids in the database management system of the preferred embodiment and bitmap values representing sets of rowids;

FIG. 11 shows a table that contains bitmap values and indexes based on the bitmap values;

FIG. 13 shows how summary bitmap values are used to locate leaf nodes in an index of bitmap values.

Figure 1:
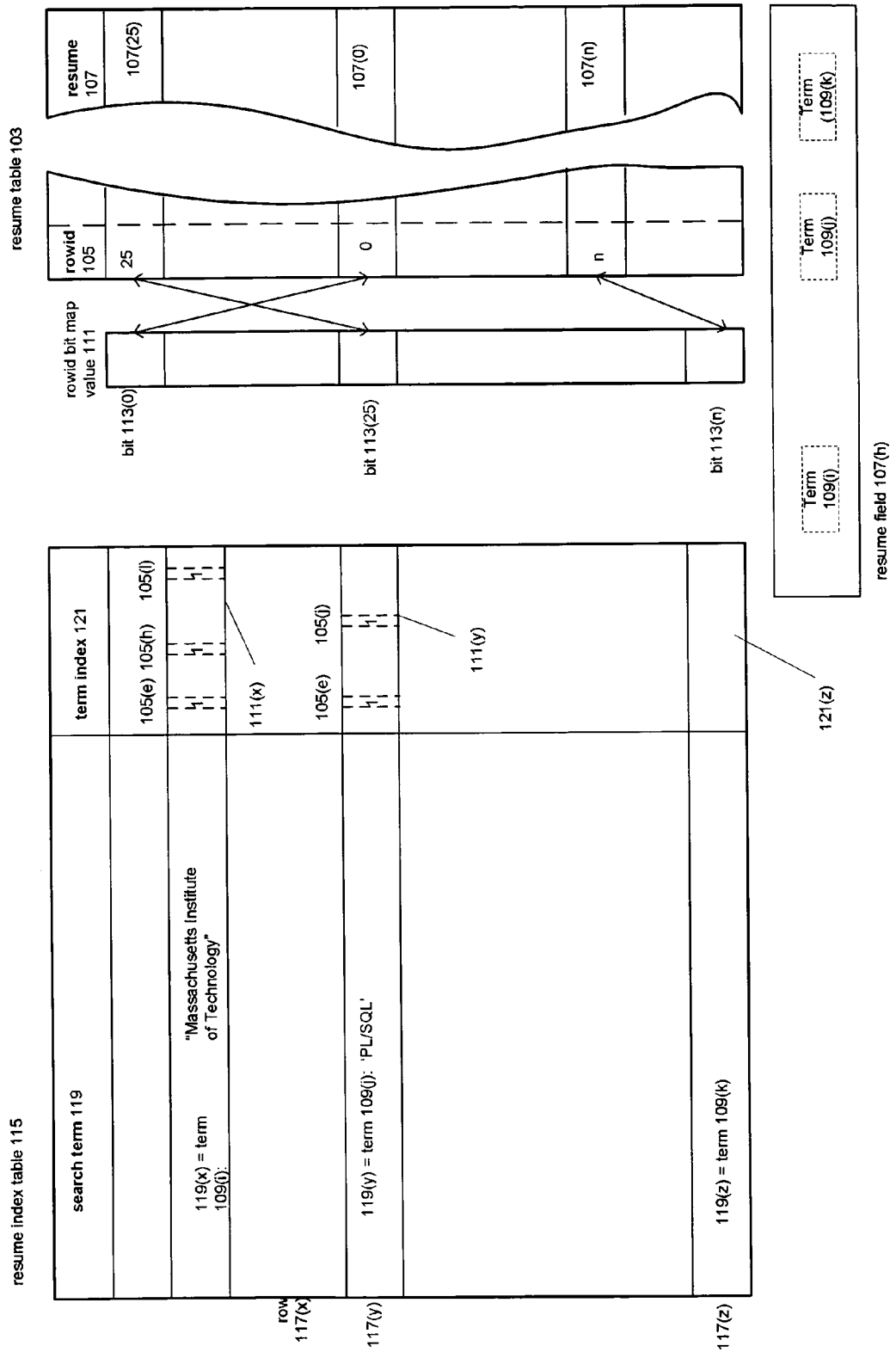
FIG. 1 is a conceptual overview of a user-defined index made using the bitmap values of the invention.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description will first present an overview of an index made using bitmap values representing sets of rowids, will then present a general overview of how bitmap values may be defined in a database management system and of the operations that may be provided for them and will finally present two different species of bitmap values, one in which the bitmap values are mapped onto sets of rowids and another in which the bitmap values are mapped onto sets of electronic product codes (ePCs). At present, product codes such as bar codes only identify kinds of products, for example, the brand and flavor of a tube of toothpaste. Each tube of toothpaste of that brand that has that flavor carries the barcode for its kind. The ePC on an individual product not only identifies the product's kind, but also uniquely identifies each individual product item. Thus, each tube of toothpaste would have its own ePC.

Overview of Bitmap Values: FIG. 1

FIG. 1 shows at 101 how rowid bitmap values 111 may be related to a set of rows in a first table 103 and how the bitmap values may be used in a second table 115 that serves as an index for information contained in the rows of the first table. In FIG. 1, table columns are identified by reference numbers and rows are identified by integers which represent the rows' rowids; a field in a row is identified by the reference number for the field's column and the integer for its rowid; thus the field belonging to rowid column 105 in the row having rowid 1 of table 103 is identified as field 105(1). What is contained in the field is of course a value of the type specified for the column to which the field belongs.

Beginning with table 103, table 103 is a table of resumes, each resume being a searchable electronic document. For purposes of the present discussion, resume table 103 has two columns, rowid column 105, which contains each row's rowid, and resume column 107, which contains a resume. As defined in Oracle 9i database management systems, a rowid is a value which uniquely identifies a row in a particular Oracle 9i database management system. In the present context, the rowid may be thought of as a large integer. There is a rowid for each row in a table in the Oracle 9i database management system, and thus every Oracle 9i table can be thought of as having a virtual column of rowids, whether or not the rowid column actually appears in the table's definition. The virtual nature of rowid column 105 is indicated by the dashed line used to define it in table 103.

A detail of a resume field 107(h) is shown below resume table 103. The resume field has the built-in type BINARY LARGE OBJECT, or BLOB, which means that the database management system treats the contents of the field simply as a collection of bytes. The only operations which the database management system can perform on fields of type BLOB are to read the bytes that the field currently contains or write a new collection of bytes to the field. It is up to the user of the database management system to properly interpret the contents of the BLOB. For example, if the contents of the BLOB were a .pdf file, the user could read the contents of the BLOB from the field and then use the Acrobat® software made by Adobe Systems, Incorporated to interpret or search the .pdf file. Contained in resume field 107(h) are a number of terms 109 that form the basis of indexes of the resumes. The terms might include items such as names of computer languages the person to whom the resume belongs is familiar with, degrees that the user has, or the educational institutions the person has attended. These terms may be located in the resume by a search utility that is part of the Acrobat software.

Since each resume is contained in a separate row of resume table 103 and is accessible via the row of table 103, the resumes may be indexed by specifying the row they belong to in resume table 103. Each row is of course identified by its rowid 105. As with the built-in bitmap indexes, a set of rowids may be specified by a bitmap value. Here, each rowid bitmap value 111 has a bit for each of the possible rowids in resume table 103 and the order of the bits representing the rowids in rowid bitmap values 111 corresponds to the numeric order of the rowids. The possible rowids in resume table 103 are those between the lowest rowid in the table and the highest rowid in the table. The rowids are not ordered by value in resume table 103 and there may be bits in the bitmap values 111 for which there are no corresponding rowids in table 103.

Resume index table 115 shows how an index to the terms 109 in the various resumes can be made using rowid bitmap values 111. Resume index table 115 is shown with two columns: a search term column 119 and a term index column 121. Each of the fields of search term column 119 contains one term for which an index of the resumes is desired. For example, if the resumes are to be indexed by computer language and educational institution, the terms might be "Massachusetts Institute of Technology", "University of North Carolina", "Worcester Polytechnic Institute," and the like for the educational institutions and "C++", "PL/SQL", "Java", and the like for programming languages.

Term index column 121 contains rowid bitmap values 111. Each of the values thus has a bit for each of the rows of resume table 103. The settings of the bits in a term index value 121(i) in row 117(i) show which of the resumes contain a term 109 which has the value specified in search term 119(i) of the row. For example, in row 117(x), the search term is "Massachusetts Institute of Technology". Three bits of term index value 121(*x*) are set: those corresponding to rowids 105(*e*), 105(*h*), and 105(*l*), indicating that the resumes 107(*e*), (*h*), and (*l*) in those rows contain the search term "Massachusetts Institute of Technology". Similarly, the search term 119(*y*) is "PL/SQL" and term index value 121(*y*) indicates that resumes 107(*e*) and (*j*) contain that search term. If a user were looking for someone with an MIT degree who knew PL/SQL, he or she could find that person by using the database management system to do the following:

1. get the bitmap values 121 from the rows in resume index table 115 which have "Massachusetts Institute of Technology" or "PL/SQL" as their search term values 119;
2. AND the returned bitmap values to get a result bitmap value in which the only bits that are set are for resumes that contain both search terms;
3. determine the rowids whose bits are set in the result bitmap; and
4. fetch the resumes 107 in the rows specified by the rowids.

It should be noted here that the only thing that can be determined from the bitmap value for a search term is whether the row with the rowid corresponding to a set bit in the bitmap value has the search term. The fact that a bit is not set can mean either that there is no row in the table corresponding to the bit's rowid or that the resume in the row does not have the search term.

As may be seen from the foregoing, the indexing arrangement shown at 101 permits the user to map bitmap values to a set of objects, to define the conditions under which a member of the set will cause the bit corresponding to the member to be set in a bitmap value, and to perform whatever bitmap operations are required on the bitmap values. Because the user can define the mapping between the bitmap value and the set of objects it represents and can define the conditions under which an object is a member of the set specified by the bitmap value, there is no longer any requirement that the values upon which bitmap indexes are based have a low cardinality. This permits bitmap indexes to be used in applications which index the occurrence of large sets of distinct patterns. Examples of such patterns are tokens in texts, biometric patterns, genome sequences, or OLAP cubes. There is also no longer any requirement that the values upon which the bitmap indexes are based are mutually exclusive. The indexing arrangement shown at 101 thus permits the use of membership conditions for the sets which specify overlapping ranges of values.

Figure 2:
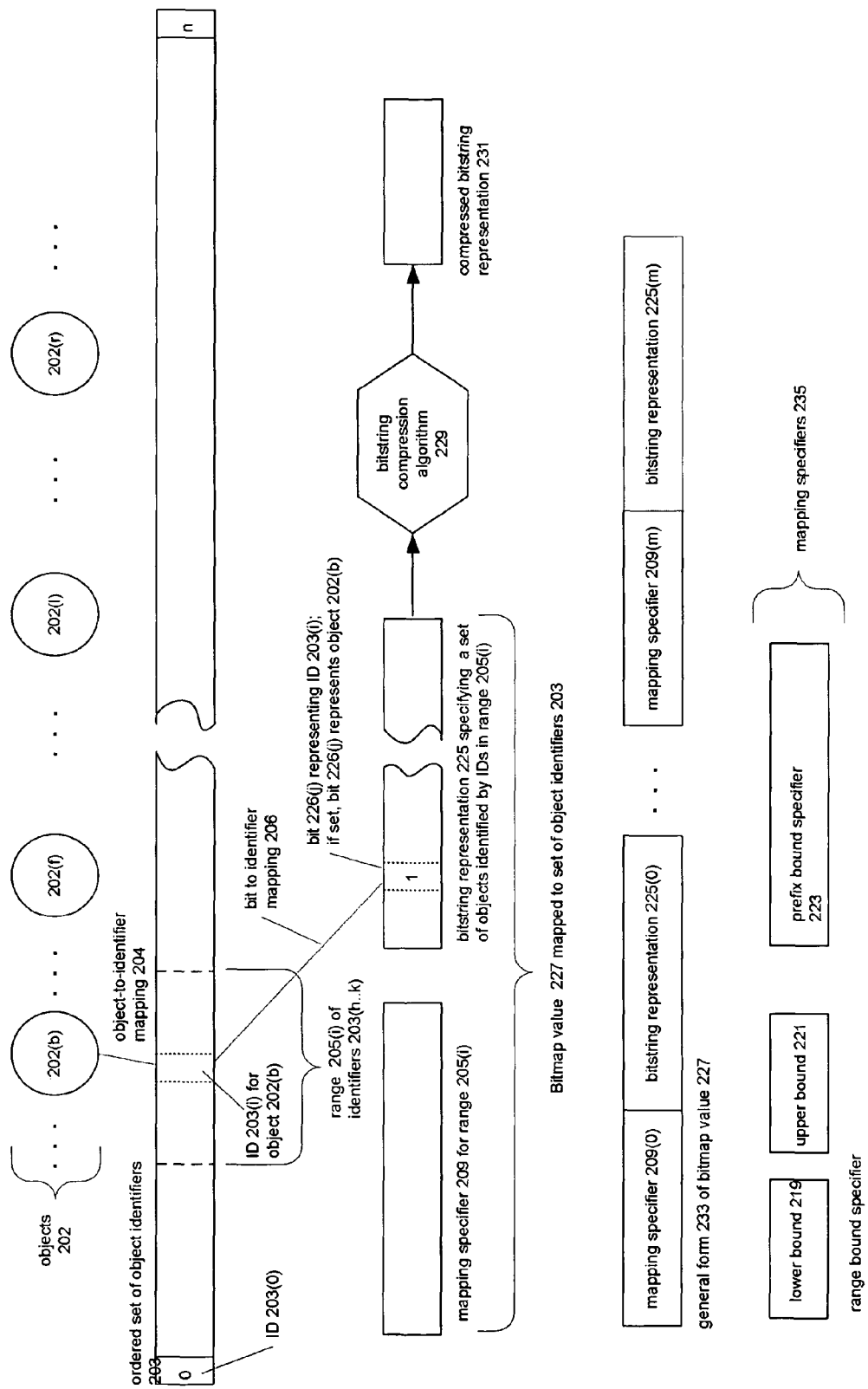
FIG. 2 is an overview of the technique used to represent bitmap values in a preferred embodiment.

Overview of the Representation of Bitmap Values: FIG. 2

Of course, any arrangement which maps a set of objects to a bitstring can be used to define bitmap values. In a preferred embodiment, however, the arrangement is the following:
 the objects are mapped to a very large set of ordered unique values. The set has a definition which is built into the database management system.
 The bitmap values' bitstring is mapped to a range of the ordered unique values.

A bitmap value thus has two parts: a mapping specifier, which specifies the range of the ordered unique values, and a representation of the bitstring. The representation of the bitstring may be simply a bit string or it may be a bitstring which has been compressed using any of the techniques available for lossless compression of bitstrings.

FIG. 2 shows techniques 201 for representing bitmap values that in turn represent sets of objects. The objects are shown at 202. In order for the objects to be represented by bitmap values, they must be mapped onto an ordered set of unique object identifiers 203(0 ... *n*). One such mapping 204 is shown: object 202(*b*) is mapped onto identifier 203(*i*). Because identifiers 203 are ordered and unique, a set of objects 202 that have been mapped onto identifiers 203 may be specified by specifying a range 205 of object identifiers 203 that includes the identifiers 203 to which the set of objects 202 have been mapped. A bitmap value 227 that specifies a subset of the objects 202 thus has two parts: mapping specifier 209, which specifies the range 205 of identifiers 203 that the bitmap is mapped to, and a bitstring representation 225. Bitstring representation 225 has a bit corresponding to each object identifier in range 205 and the bits are ordered in the same fashion as the object identifiers. Thus, there is a mapping 206 between each bit in bitstring 225 and an identifier 203 in range 205. Because of the mapping 204 and the mapping 206, bit 226(*j*) has been mapped to object 202(*b*). If object 202(*b*) is in the subset represented by bitmap value 227, bit 226(*j*) will be set. If bit 226 (*j*) is not set, that may mean either that object 202(*b*) is not in the subset or that there is no object 202 mapped to bit 226(*j*). Bitstring representation 225 may be a simple bitstring or it may be compressed using any lossless bitstring compression algorithm to produce compressed bitstring 231.

Important attributes of bitmap values are their type, which is determined by the ordered set of object identifiers onto which the bitmap values are mapped, and their class, which is determined by the range(s) of object identifiers onto which the bitmap values are mapped. Thus, all bitmap values 227 which are mapped to the range 205(*i*) specified by mapping specifier 209 have the same class. In the preferred embodiment, there are two types of bitmap values: rowid bitmap values, which are mapped to the set of rowid values in the database management system containing the bitmap values, and ePC bitmap values, which are mapped to the set of values that make up the electronic product code. In a preferred embodiment, the type required for a bitmap value or operation is indicated in the definition of the bitmap value's field or of the operation being performed on the bitmap value. The class of the bitmap value in a preferred embodiment is implied by the bitmap value's mapping specifier 209. In other embodiments, the class required for a bitmap value may be indicated in the definition of the bitmap value's field. For example, the definition of the column to which the field belongs may require that the bitmap value be a rowid bitmap value for which the range of rowids is the range of rowids in a particular table. The type and class of a bitmap value can be used to determine whether an operation on a bitmap is legal and to perform conversions. For example, operations involving operands whose bitmap values have different types are not legal and in some embodiments, bitmap value operands for some operations may be required to have the same class. Where operands are not required to have the same class, performing an operation may require that the operands are converted into a common class.

Also shown in FIG. 2 are a general form 233 for a bitmap value 227 and two ways of representing ranges in a mapping specifier 209, shown at 235. The general form of a bitmap value 227 is a set of mapping specifier 209 and bitstring representation 225 pairs; more than one pair may be used either because it is required by a property of the ordered set of object identifiers 203 or because the mapping of objects 202 to identifiers is sparse, so that specifying a number of mapping specifier and bitstring representation pairs requires less storage space than specifying a single mapping specifier and a bitstring representation 225 large enough to include the whole range specified in the mapping specifier.

One way of specifying the bounds of the range in mapping specifier 209 is by specifying its lower bound 219 and its upper bound 221, as shown at 217. Another is by using a prefix bound specifier, as shown at 223. To give some examples, if the ordered set of objects includes 100 objects 0 . . . 99, objects 20-29 may be specified by the range specifier 20-29. Alternatively, the numbers 0 . . . 99 may be seen as each containing a prefix, namely the 10's digit, and a suffix, namely the 1's digit and the range 20-29 may be represented by the prefix 2, the range 0-9 by the prefix 0, and so on. Which is used will of course depend on the kinds of ranges desired. For example, in the rowids employed in the Oracle 9i database management system, the rowid's object number, file number, and block number could be used as a prefix for a range of rowids that would include all of the rowids belonging to the table specified by the object number.

Overview of User-Accessible Bitmap Operations: FIGS. 3-6

The user-accessible bitmap operations of the invention fall into four groups. The operations are shown in detail in FIGS. 3-6. For details of the semantics of the operations, see the descriptions of the figures.

1. conversion operations that convert to and from bitmap values: FIG. 3
   a. bitmap to set: converts a bitmap value to the set of object identifiers specified by the set bits in the bitmap value's bitstring;
   b. set to bitmap: converts a set of the object identifiers to the bitmap value that represents the set;
   c. bitmap to count: converts a bitmap value to a count of the number of set bits in the bitmap and hence to the number of objects in the object set represented by the bitmap.
2. the existence operation: determines whether the set of object identifiers represented by a bitmap value includes the object identifier for a particular object: FIG. 4
3. logical operations on bitmap values: FIG. 5
   a. bitmap AND: ANDs two bitmap values that have the same class;
   b. bitmap OR: ORs two bitmap values that have the same class;
   c. bitmap XOR: XORs two bitmap values that have the same class; and
   d. bitmap MINUS: removes object identifiers in the set specified by one bitmap value of a class that are also in the set specified by another bitmap value of the same class from the one bitmap value.
4. Changing the set of object identifiers represented by a bitmap value: FIG. 6
   a. bitmap insert: takes a set of object identifiers and a bitmap value and if any of the set is not included in the range specified for the bitmap value's class, expands the range and creates a new bitmap value for the expanded range in which both the bits that were formerly set and the bits corresponding to the object identifiers in the set are set.
   b. bitmap delete: takes a set of object identifiers and a bitmap value and if any of the set is included in the range specified for the bitmap value's class, setting the bit for the object identifier in the bitmap value to 0.
5. Bitmap comparison: the bitmap EQUALS operation compares two bitmap values and determines whether the two values represent the same set of object identifiers. See FIG. 4
6. Bitmap assignment: assigns a source bitmap value to a target variable that represents a bitmap value of the same type as the source value. See FIG. 3

The Conversion Operations: FIG. 3

FIG. 3 provides examples of conversion operations 301 and of a bitmap assignment. A class of bitmap values that will be used in the following examples of the operations is shown at 303. The bitmap values of the class have a mapping specifier that specifies range 20-29 of object identifiers 203 and a ten-bit bitstring whose bits 0 . . . 9 have been mapped onto object identifiers 20 . . . 29. In the following discussion, the bitmap values will be represented by the notation <lower_bound-upper_bound>:<bitstring>. Thus, as shown at 305, bitmapval_1, which represents the set of objects corresponding to the identifiers 22 and 27, has bits 2 and 7 set and is represented by the notation 20-29:0010000100.

In bitmap-to-set operation 307, the bitmap_to_set operator takes a single operand, namely a bitmap value, in this case, the bitmap value bitmapval_1, and returns the identifiers specified by the set bits in the bitstring, in this case identifier(22) and identifier(27).

In set-to-bitmap operation 309, the set_to_bitmap operator takes a set of object identifiers, here the set made up of identifier(20), identifier(23), and identifier(24), and returns a bitmap value bitmapval_2 whose mapping specifier specifies the range 20-24 and has a 5-bit bitstring in which bits (0), (3), and (4) corresponding to those object identifiers have been set, giving the bitmap value 20-24:10101. That bitmap value has been assigned to the variable bitmapval_2. The variable must have the type of the source bitmap value being assigned to it and will have the source bitmap value's class and value after the assignment.

In bitmap-to-count operation 311, the bitmap_to_count operator takes a bitmap value of any class and returns the number of bits that are set in the bitmap, i.e., the number of object identifiers in the set represented by the bitmap. Two examples are given: bitmap_to_count(bitmapval_1) returns 2 because that many bits are set in the bitmap value; bitmap_to_count(bitmapval_2) returns 3 because that many bits are set in that bitmap value.

The Existence Operation and the Equals Operation: FIG. 4

The existence operation takes a bitmap value and an object identifier of the kind corresponding to the bitmap value's type and returns 1 if the bit corresponding to the object identifier is set in the bitmap value and 0 if it is not. 0 thus indicates either that the object identifier is in the bitmap value's range but its bit is not set or that the object identifier is not in the bitmap value's range. In FIG. 4, the bitmap value is bitmapval_1, in which the bits representing object identifiers 22 and 27 are set. As shown at 405, when the object_exists operator has identifier(26) as its object identifier argument, it returns 0, since object identifier(26)'s bit is not set in bitmapval_1. When the operator has identifier(22) as its object argument, it returns 1, since identifier(22)'s bit is set in bitmapval_1.

The equals operation takes two bitmap values that belong to the same type and returns 1 if the two bitmap values represent the same set of object identifiers and otherwise 0. As shown at 407, the operation returns 1 when bitmapval_1 is compared with the result of a set_to_bitmap operation that returns a bitmap with bits set for object_id(22) and object_id (27) and 0 when bitmapval_1 is compared with bitmapval_2. In this operation, both bitmap values are converted to the same class before the comparison is made.

Logical Operations on Bitmap Values: FIG. 5

These operations are like the logical operations performed on bitstrings. The operations all have two bitmap operands belonging to the same class. In a preferred embodiment, if both bitmap values have the same type, one or both of the operands are converted to a class whose range includes both operands. If the bitmap values have different types, an error results. The operations and their results are shown at 501 in FIG. 5. The operands are bitmap values bitmapval_1 and bitmapval_2, whose values are shown at 503. At the beginning of each of these operations, bitmapval_2 is converted to the class of bitmapval_1. The bitmap-AND operation is the standard logical AND operation, as shown at 505; the bitmap-OR operation is the standard logical OR operation, as shown at 507; and the bitmap-XOR operation is the standard logical XOR operation, as shown at 509. The bitmap-XOR operation returns a bitstring containing all 0's when the two operands are identical and therefore can be used to implement the bitmap equals operation. The bitmap-minus operation makes a result bit string in which bits are set as in the first operand except where the same bits is set in both the first and second operands, in which case the corresponding bit in the result is reset. It is equivalent to the logical operation bitmapval_1 AND (NOT bitmapval_2). The operation is shown at 511.

Changing the Set of Object Identifiers Represented by a Bitmap Value: FIG. 6

When the set of object identifiers represented by a bitmap value changes, the bitmap value must also change. The change may only involve setting and/or resetting bits already contained in the bitmap value's bitstring, but it may also involve changing the mapping specifier and the length of the bitstring. The operations for changing the set of object identifiers represented by the bitmap value are the bitmap insert operation, which adds object identifiers to the set, and the bitmap delete operation, which deletes object identifiers from the set. With both operations, the operands are the bitmap value to be changed and a set of object identifiers to be added to or deleted from the bitmap value.

The bitmap insert and delete operations are shown at 601 in FIG. 6. The bitmap value operand is bitmapval_1, shown at 603. The bitmap insert operation is shown at 605. The second operand is the set of object identifiers {object_id(28), object_id(29)}. Neither of these objects is already included in the set represented by bitmapval_1; the second object is furthermore outside bitmapval_1's current range. Consequently, the bitmap insert operation extends bitmapval_1's range so that it can include both new objects. The new value of bitmapval_1 is thus 20-33:00100001100001, whose bitstring representation represents 14 bits and in which the bits are set that represent object identifiers 22, 27, 28, and 33.

The bitmap delete operation is shown at 607. Here, the second operand is the set of objects {object_id (27),object_id (28)}. Both of these object identifiers are within the range of bitmapval_1, but only object identifier 27 is in the set of object identifiers represented by bitmapval_1, so the result of the operation is a new value of bitmapval_1 in which bit 7 corresponding to object_id (27) has been reset. As already explained, some bitmap values may be represented as a set of mapping specifier and bitmap pairs; when that is the case and the bitmap delete operation deletes all of the objects in a subrange, the mapping specifier and bitmap pair for the subrange may be removed from the set of mapping specifier and bitmap pairs.

Figure 7:
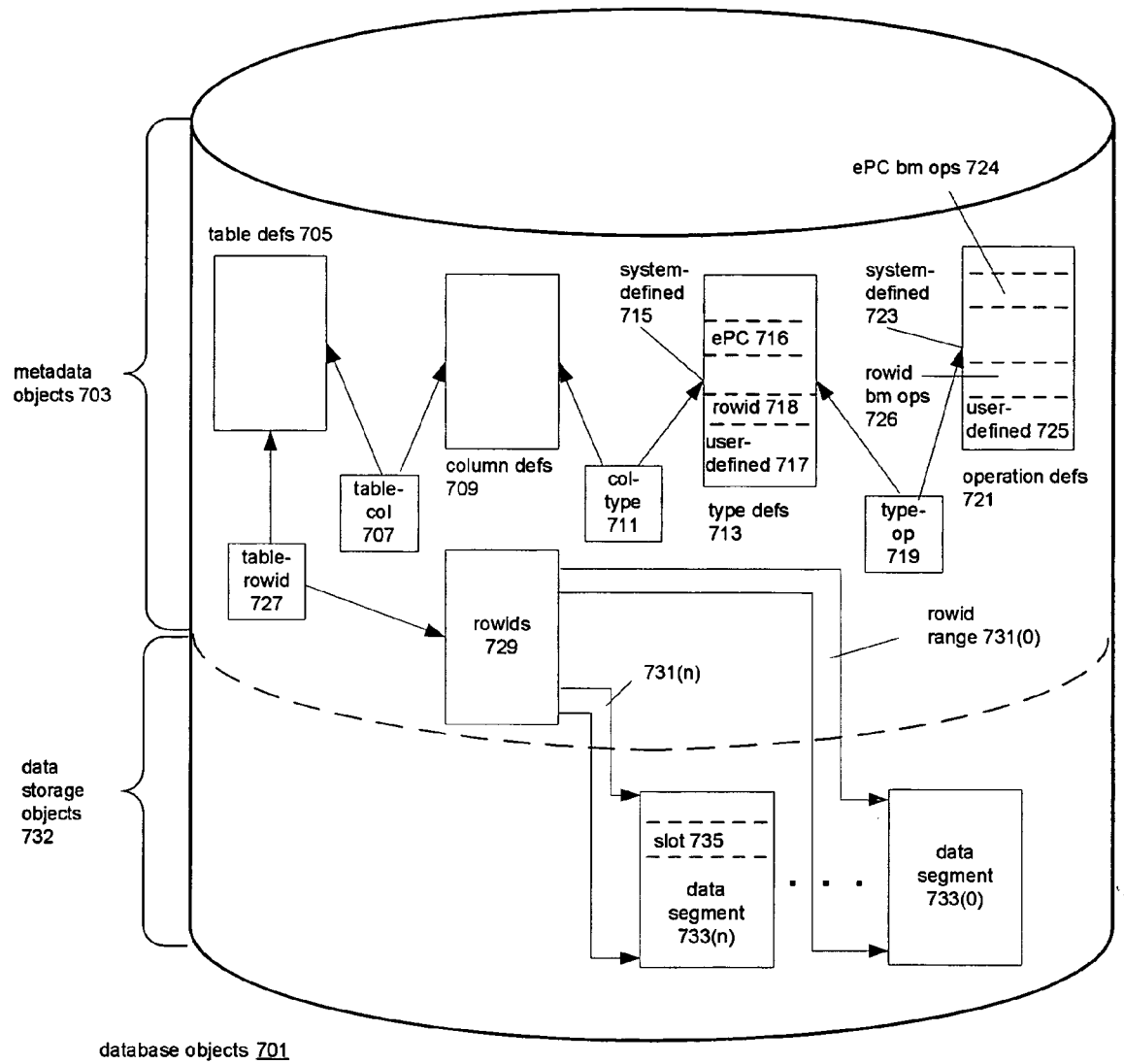
FIG. 7 shows the metadata objects in a database management system in which the invention is implemented.

A Database Management System with Bitmap Datatypes: FIG. 7

FIG. 7 is a conceptual overview of database objects 701 belonging to a database management system that implements two bitmap datatypes: a rowid bitmap data type in which the set of object identifiers to which the bitmap values are mapped is the set of rowids in the database management system, and an ePC bitmap data type in which the set of object identifiers is a set of electronic product codes. Database objects 701 fall into two classes: metadata objects that define all of the objects in the database management system, including the metadata objects themselves, and data storage objects 732, in which the data making up the objects is stored. Data storage objects 732 are contained in persistent storage such as a file system.

Continuing with metadata objects 703, table definitions 705 is a table whose entries are definitions of the tables in the database management system. There is an entry in this table for each of the tables. Column definitions 709 is a table whose entries are definitions of the columns used in the tables. Type definitions 713 is a table whose entries are definitions of the data types specified for the columns. In the database management system of the invention, type definitions 713 include system-defined types 715 and user-defined types 717. Included in the system-defined types are rowid bitmap type 718 and ePC bitmap type 716. Associated with each type, whether user-defined or system defined, is a set of operations. These are defined in operation definitions table 721. Included in table 721 are definitions of user-defined operations 725 and definitions of system-defined operations 723. Among the system-defined operations are operations 726 for rowid bitmap values and operations 724 for ePC bitmap values. User-defined operations may employ code contained in the database management system or code external to the database management system. Rowid table 729, finally, is a table of the rowids for all of the rows currently in the database management system. The rowids are arranged in sequential order, with each data segment 733(*i*) defining a range of rowids 731 (*i*). Each rowid points to a slot 735 in a data segment 733 that actually contains the data for the row indicated by the rowid. Large tables may have data in more than one data segment 733.

The tables defined in table definitions 705 are related to rowids for the table's rows by table-rowid relation table 727 and to column definitions 709 for the table's columns by table-column relation table 707. Column definitions are related to type definitions by column-type relation table 711 and type definitions are related to operation definitions by type-operation definition table 719. These relation tables make it possible to determine what columns and rows belong to a table defined in table defs 705, what types the columns have, and what operations the types have.

The Rowid Bitmap Data Type

In the rowid bitmap data type, the database management system's rowids make up ordered set of object identifiers 203. The objects 202 which may be mapped to the rowids are any objects contained in the database rows represented by the rowids. In a rowid bitmap value, mapping specifier 209 maps the bitstring 225 onto a range of rowids. Each bit of the bitstring represents one of the rowids in the range. When a bit is set in bitstring 225, the set bit represents the presence of a particular value in one or more of the fields in the row whose rowid corresponds to the set bit in the bitstring. The following discussion will begin with details of rowids in a preferred embodiment and of the representation of sets of rowids employed in a preferred embodiment, will then summarize operations on rowid bitmap values, and will finally disclose an implementation of resume table 103 and resume index table 115 using rowid bitmap values.

Details of the Rowid Bitmap Data Type: FIG. 10

Form of Rowids

In the Oracle 9i database management system, rowids use a base 6 encoding of the physical address for the row specified by the rowid. The encoding characters are A-Z, a-z, 0-9, +, and /. An extended rowid has a four-piece format, OOOOOOFFFBBBBBBRRR:

OOOOOO: The data object number that identifies the database segment. Schema objects in the same segment, such as a cluster of tables, have the same data object number.

FFF: The tablespace-relative datafile number of the datafile that contains the row.

BBBBBB: The data block that contains the row. Block numbers are relative to their datafile, not tablespace. Therefore, two rows with identical block numbers could reside in two different datafiles of the same tablespace.

RRR: The offset for the storage for the row in the block.

FIG. 10 shows a rowid 1003, with data object number 1005, data file number 1007, data block number 1009, and row offset 1011.

Rowid Bitmap Values

The general form of a rowid bitmap value 1019 is shown at 1019 in FIG. 10. Rowid bitmap values are made up of a sequence of one or more mapping specifiers 1021 and bit-string representations 1027. In a rowid bitmap value, the mapping specifier specifies ranges of rowids by specifying a rowid range start value 1023 and a rowid range end value 1025. There is a range bitstring representation 1027 corresponding to each mapping specifier, and the bitstring has a bit for each of the rowids in the range specified by the mapping specifier.

One situation in which more than one mapping specifier 1021 and range bitstring 1027 is employed is when the range of rowids to which the bitstring is being mapped includes rowids specifying locations in more than one data segment 733. When the mapping specifier maps the bitmap to rowids that are contained in more than one data segment 703, the bitmap value takes the form <mapping specifier for the range (i) of rowids in segment a>:<bitmap representation for range (i)>, <mapping specifier for the range (j) of rowids in segment b>:<bitmap representation for subrange (j)> . . . and so on for all of the subranges that are necessary to map the bitmap value onto the rowids. This technique can of course be used in any case where a bitmap value may represent objects whose values do not form a continuous sequence. It can also be used when the objects of interest are sparsely dispersed across the range of objects. In such a situation, a collection of mapping specifiers for subranges of interest, each with its own bitstring representation, may require less storage space than a single mapping specifier and very large bitstring specification for the entire range over which the objects are dispersed.

Specifying a Column of Rowid Bitmap Values in a Table

The DDL for specifying resume index table 115 looks like this:

```
CREATE TABLE ResumeIndexTable
    (SearchTerm CHAR(30),
    TermIndex ROWIDBITMAP);
```

In a preferred embodiment, the fields of the column TermIndex must contain rowid bitmap values but may contain rowid bitmap values of any class. In other embodiments, the DDL may specify a table to which the rowids that are mapped to the bitmap values belong, and in that case, the bitmap values in the column can be constrained by the database management system to belong to the class of bitmap values that are mapped to the table's rowids.

Operations on Rowid Bitmap Values

The following operations are defined for rowid bitmap values in operation definitions 721:

1) Conversion operations
   a) BITMAP2ROWIDS: This function converts a rowid bitmap value to the corresponding set of rowids.
   b) BITMAP2COUNT: This function converts a rowid bitmap value to the corresponding count of rows for which bits are set in the rowid bitmap value
   c) ROWIDS2BMAP: This function converts a set of row identifiers to a rowid bitmap value.
2) The existence operation: ROWIDEXISTS: This function determines whether a rowid belongs to the set of rowids represented by a rowid bitmap value.
3) Logical operations:
   a) BITMAP_AND: This function takes two rowid bitmap values and returns a rowid bitmap value which is the AND of the two operands;
   b) BITMAP_OR: This function takes two rowid bitmap values and returns a rowid bitmap value which is the OR of the two values.
   c) BITMAP_XOR: This function takes two rowid bitmap values and returns a rowid bitmap value which is the XOR of the two values.
   d) BITMAP_MINUS: This function returns the result of the first rowid bitmap argument MINUS the second rowid bitmap argument.
4) Changing the set of rowids represented by a rowid bitmap value:
   a) BITMAP_INSERT: This function takes a rowid bitmap value and set of rowids as arguments and sets the bits in the rowid bitmap value corresponding to the rowids in the set.
   b) BITMAP_DELETE: This operation takes a rowid bitmap value and a set of rowids as arguments and resets the bits in the rowid bitmap value corresponding to the rowids in the set.
5) BITMAP_EQUALS: this operation takes two rowid bitmap values as arguments and returns a value that represents TRUE if the bitmap values represent the same set of rowids and otherwise returns a value that represents FALSE. The values may be converted to the same class before the operation is performed.
6) assignment: this operation assigns a source rowid bitmap value to a rowid bitmap target variable such as a field in a table. At the end of the operation, the target variable has the source value's class and value.

The operations on rowid bitmap value work as described in the general discussion of bitmap operations. In a preferred embodiment, the class of the result bitmap in the ROWIDS2BMAP, BITMAP_INSERT, and BITMAP_DELETE operations is determined from the rowids contained in the result bitmap. With the logical operations, the operands are converted to bitmap values of a class which includes all of the rowids specified in the operand bitmap values. In assignments of bitmap values, the target bitmap acquires the class and value of the source bitmap value. Other embodiments may require that the source and target bitmap values have the same class in the assignment operation or that the operands in the logical operations have the same class.

Implementing Resume Table 103 and Resume Index Table 115 with Rowid Bitmap Values ResumeTable 103

ResumeTable 103 has a column, Resume 107, whose values are objects of a user-defined class resume. The user-defined operation which is of interest for this class is a contains operation that takes a character string and a resume object as operands. The operation uses the Acrobat search operation to determine whether a resume contains a particular character string. The existence of this operation makes it possible to query resume table 103 for resumes containing a particular character string.

ResumeIndexTable 115

ResumeIndexTable 115 has a column, TermIndex 121, whose values are rowid bitmap values representing sets of the rowids for the rows in ResumeTable 103 and a column SearchTerm 119 whose values are terms that are of interest in the resumes of table 103. The set of the rowids of ResumeTable 103 represented by the value of TermIndex in a particular row of ResumeIndexTable 115 is made up of the rowids from ResumeTable 103 for the rows in which the resume in the resume field contain the value of SearchTerm 119 in the particular row of ResumeIndexTable 115.

Setting the Bitmap Values in ResumeIndexTable 115

A query on resume table 103 that uses values from search term column 119 in resume index table 115 can be used to set bitmap values in term index column 121. One version of the query would look like this:

```
UPDATE ResumeIndexTable
    SET TermIndex := ROWIDS2BITMAP( TO_SET(
        SELECT rowid FROM ResumeTable
        WHERE contains (Resume, "Massachusetts
            Institute of Technology")))
    WHERE SearchTerm = "Massachusetts Institute of
        Technology";
```

This query sets TermIndex in each row of ResumeIndexTable to the bitmap value corresponding to the rowids for the rows in ResumeTable whose Resume fields contain resumes with the search term specified by SearchTerm. The rowids are found by a SELECT query that uses the user-defined contains function, and the result of the query is converted to a set of rowids by the TO_SET operation and the set of rowids is converted to a bitmap value by ROWIDS2BITMAP.

Using the Bitmap Values to Locate Resumes in ResumeTable 103

A query that produced those resumes from ResumeTable 113 in which both the terms "Massachusetts Institute of Technology" and "PL/SQL" appeared might look like this:

```
SELECT resume FROM ResumeTable
    WHERE rowid IN BITMAP2ROWIDS(BITMAP_AND(
        (SELECT TermIndex FROM ResumeIndexTable WHERE
            SearchTerm = "Massachusetts Institute of
            Technology"),
        (SELECT TermIndex FROM ResumeIndexTable WHERE
            SearchTerm = "PL/SQL")));
```

In this query, the resumes are selected from ResumeTable on the basis of the rowids which the bitmap values in ResumeIndexTable show have resumes which contain both of the search terms "Massachusetts Institute of Technology" and "PL/SQL". Starting at the bottom of the query, the TermIndex bitmap values are selected using the two search terms; these bitmap values are then the operands of the BITMAP_AND operation; the bitmap value that results form the BITMAP_AND operation contains set bits for the rowids for every row in ResumeTable whose Resume field contains both of the search terms. The result bitmap value is then used as an operand in the BITMAP2ROWIDS operation, which produces the set of rowids specified in the result bitmap value, and these in turn are used to select the resume fields containing the desired resumes.

Maintaining the Bitmap Values in TermIndex Column 121

Whenever a row in ResumeTable 103 is updated or a row is added to or deleted from table 103, the bitmap values in TermIndex row 121 must be recomputed so that they reflect the current state of the resumes in ResumeTable 103. In the relational database management system of the preferred embodiment, such recomputation is done by means of one or more trigger programs that have been written for ResumeTable 103 and are executed whenever a row is modified in ResumeTable 103, deleted from the table, or added to it.

One way of doing the recomputation would be to have the trigger execute the query disclosed above that is used to compute all of the bitmap values in TermIndex column 121. However, this approach requires that every resume in the table is searched, and as ResumeTable 103 grows in size, the overhead of this approach grows as well. The overhead can be reduced by using the BITMAP_INSERT operation, which requires only that the resumes in the added rows be searched and the BITMAP_DELETE operation, which simply resets the bit in a rowid bitmap which corresponds to a deleted row. When a row of ResumeTable 103 is updated, it is treated as a deletion of a row followed by an insertion of a new row. Code for a trigger on ResumeIndexTable 115 that updated the values in TermIndex column 121 when a row was added to ResumeIndexTable 115 might look like this:

```
AFTER INSERT OF Resume ON ResumeTable FOR EACH ROW
DECLARE    BitmapIn  ROWIDBITMAP;
           BitmapOut ROWIDBITMAP;
BEGIN
   FOR Each Search_Term IN new:Resume
      SELECT TermIndex INTO BitmapIn FROM ResumeIndexTable
         WHERE contains(new:Resume, Search_Term);
      IF BitmapIn is NOT NULL
         ROWID_BITMAP_INSERT (BitmapIn,
         TO_SET(new:RowID),
            BitmapOut);
         UPDATE ResumeIndexTable SET TermIndex =
            BitmapOut WHERE
            ResumeIndexTable.SearchTerm = Search_Term;
      ELSE
         INSERT INTO ResumeIndexTable VALUES
            (Search_Term,
            ROWIDS2BMAP(TO_SET(new:RowID)));
      END IF;
   END LOOP;
END;
```

The code in the trigger is executed on each row of ResumeIndexTable 115 whenever a row is added to ResumeTable 103. The two bitmap variables are used for bitmap values within the trigger. The SELECT statement determines whether the value of the field SearchTerm in the row is found in the field Resume in the new row of ResumeTable 115. If it is found, the bitmap in the field TermIndex for the row of ResumeIndexTable 115 is copied to the bitmap variable BitmapIn.

ROWID_BITMAP_INSERT is then used to modify the bitmap value in BitmapIn as required for the relevant new row of ResumeTable. The modified bitmap value is in BitmapOut. If a bit corresponding to the rowid is already in the rowid value in BitmapIn, it is set in BitmapOut; if there is no bit corresponding to the rowid in BitmapIn, BitmapOut's mapping specifier is modified to include the rowid, a bitmap is made that corresponds to the mapping specifier, and the bits that were set in BitmapIn, as well as the bit for the new rowid, are set in BitmapOut. The UPDATE statement is then used to set the TermIndex bitmap value in the relevant row of ResumeIndexTable 115 to the bitmap value contained in BitmapOut.

Other Applications of Rowid Bitmap Values

Every row in a relational database management system has a rowid and any query can return the rowids of the rows which satisfy the query; consequently, rowid bitmap values can be used to represent subsets of any set of objects in the database management system for which a query may be defined. Since a row may contain many objects, the specific set of objects which is represented by a given rowid bitmap value depends on the query which was used to obtain the rowids.

A consequence of the fact that rowid bitmap values can be used to represent subsets of any set of objects for which a query may be defined is that bitmap indexes may be made using the techniques shown with regard to FIG. 1 for any set of objects which satisfies the following conditions:

objects belonging to the set can be represented one or more columns of a database table; and the objects in the set have one or more queryable attributes.

What is required for the index is one or more primary tables with columns whose values represent the objects being indexed and an index table which contains at least a column whose values are queryable attributes of the objects being indexed and a column whose values are rowid bitmap values. In each row of the index table, the row's bitmap value shows which of the objects being indexed in the primary table have the value of the queryable attribute specified in the row of the index table. About the only limitation on what can be indexed using bitmaps of rowids is that each object being indexed requires its own row in a table in the database management system. Where the number of objects being indexed is truly large, the required number of rows may be beyond the capacity of the database management system.

A consequence of the fact that any queryable attribute may determine whether a bit is set in a bitmap is that the bitmap may be set according to any property of an attribute. For example, if greater than and less than operations may be performed on the attribute values, queries may be based on ranges of the attribute values and because each range of the attribute values may correspond to a different bitmap value, the ranges of the attribute values may overlap. To give a simple example, if the object being indexed has a temperature attribute, there may be bitmap values for the Fahrenheit ranges 32-98.6 and 32-212.

At the most fundamental level, rowid bitmap values are persistent representations of sets of rows in a database management system. Further, since every query returns a set of rowids, any query may be persistently represented by a rowid bitmap value specifying the returned set of rowids. For example,

```
BitmapValue:= ROWIDS2BITMAP ( TO_SET(
    SELECT rowid FROM ResumeTable
    WHERE (contains (
    ResumeTable.Resume,
    ResumeIndexTable.SearchTerm
    ))));
``` sets the bitmap variable BitmapValue to the bitmap for the rowids returned by the SELECT statement. As long as the rowids in ResumeTable do not change, BitmapValue can be used to retrieve the rows specified by the query from which BitmapValue was set.

The ePC Bitmap Data Type

An example of a set of objects that is too large to be represented by making a table in which each object has a row is the set of objects that are identified by ePCs. For that reason, a preferred embodiment of the database management system of FIG. 7 includes a built-in EPC bitmap data type 716 and system-defined ePC bitmap operations 724. The following discussion will first describe ePCs in detail, will then describe bitmap values that are mapped to ePCs and therefore have the ePC bitmap data type, the operations for the ePC bitmap data type, and finally examples of the use of ePC bitmap values.

ePCs: FIG. 8

An electronic product code or ePC, is a standard product code which uniquely identifies an individual product item. The standard for ePCs is still under development. As set forth in EPC™ Tag Data Standards Version 1.1 Rev. 1.23, Last Call Working Draft on 16 Feb. 2004, copyright 2003, EPC Global, which is hereby incorporated by reference, an ePC may have 64 or 96 bits. The general form of the 96-bit ePC is shown at 801 of FIG. 8. The 96-bit value is divided into four fields: an 8-bit header field 803, which defines the sizes of the following fields and how they are to be interpreted, a general manager field 805, which identifies an entity such as a manufacturer who manages a set of ePC codes, an object class field 807, which identifies a class of objects, for example, a product made by the manufacturer identified in field 805, and a serial number field 809 which identifies individual items of the product specified by object class identifier 807. An ePC value is often divided into two parts: the prefix 811, made up of fields 803-807, and the suffix 813, made up of serial number field 809. The length of the suffix may be determined by information in header 803. As can be seen by the decimal capacities indicated by fields 805, 807, and 809, the 96-bit ePC can identify astronomical numbers of objects. The 64-bit ePC is smaller, but has the same overall form as the 96-bit ePC. In the preferred embodiment, there are two types of bitmap values representing sets of ePCs. Bitmap values representing sets of 96-bit ePCs belong to one of the types and those representing sets of 64-bit ePCs belong to the other. The following discussion of ePC bitmap values applies to ePC bitmap values of both types.

ePC Bitmap Values

The problem which ePC values present for database management systems that are managing inventory is that each product item now has a 96-bit (or 64-bit) unique identifier. If the usual database management system techniques for representing objects are used, product items will be identified by fields in tables, with each product item having a row in the table and each row requiring a field for the product item's ePC. Further, messages indicating what product items are in an inventory will also require an ePC for each product item. The amount of space that is required within a database management system or within a message indicating that a product item is in an inventory can be greatly reduced if a set of product items is represented by a bitmap value whose mapping specifier maps the value's bitmap onto a set of the ePCs. If the product item to which a specific ePC belongs is present in a group of product items, then the bit corresponding to the ePC is set in the bitmap value. The bitmap value can thus replace a list of as many ePCs as there are bits in the bitmap value.

Ways of implementing ePC bitmap values are shown at 815 and 816. The simplest form 815 of an ePC bitmap value uses ePC prefix 811 by itself as the mapping specifier 817 and bitstring 819 represents all of the suffixes that may have the prefix. When an item having the suffix is present in the set of ePCs represented in the bitmap value, the item's bit in the bitmap value is set. In many cases, the serial numbers in a set of ePCs of interest all have the same most significant bits. In this case, mapping specifier 817 can be extended beyond ePC prefix 811 to include the same most significant bits. The bit string then represents the set of all serial numbers having the same prefix 811 and the same most significant bits.

Form 816 of an ePC bitmap value uses ePC prefix 811 together with a set of range start 819 and range end 821 values that specify ranges of suffix values as the mapping specifier. Each pair of start and end values ($819(i)$, $821(i)$) corresponds to a range bitmap $823(i)$ that contains the bitmap which has been mapped onto the range of suffixes specified by the start and end values ($819(i)$, $821(i)$). Where suffix values are sparsely distributed across the total range of suffix values, bitmap values of form 816 allows substantial reduction of the size of the bitmap value. Of course, the bitstrings in both implementations of ePC bitmap values may be compressed by means of any available lossless compression technique. Further, the range start and range end values may be used with extended mapping specifier prefixes like the one shown at 817.

ePC Bitmap Operations

The ePC bitmap operations are what one would expect given the nature of ePCs:

1. Conversion operations
   a. EPC_BITMAP2EPCS: This function converts an ePC bitmap value to the set of ePCs represented by the ePC bitmap value.
   b. EPCS2EPC_BITMAP: This function converts a set of ePCs to an ePC bitmap value.
   c. EPC_BITMAP2COUNT: This function converts an ePC bitmap value to the count of ePCs represented by the number of set bits in the ePC bitmap value.
2. The existence operation: EPC_BITMAP_EXISTS: This function returns 1 or 0 depending on whether a bit representing the given ePC(the second argument) is set in the ePC bitmap value (first argument).
3. Logical operations:
   a. EPC_BITMAP_AND: This function takes two ePC bitmap values and returns the AND of the bitmap values;
   b. EPC_BITMAP_OR: This function takes two ePC bitmap values and returns the OR of the bitmap values
   c. EPC_BITMAP_XOR: This function takes two ePC bitmap values and returns the XOR of the ePC bitmap values.
   d. EPC_BITMAP_MINUS: This function takes two ePC bitmap values and returns the first ePC bitmap value MINUS the second ePC bitmap value.
4. Changing the set of objects represented by an ePC bitmap value:
   a. EPC_BITMAP_INSERT: This function takes an ePC bitmap value and a set of ePCs and sets the bits in the bitmap value corresponding to the ePCs in the set.
   b. EPC_BITMAP_DELETE: This function takes an ePC bitmap value and a set of ePCs and resets the bits in the bitmap corresponding to the ePCs in the set.
5. Comparing two ePC bitmap values for equality: EPC_BITMAP_EQUALS: this function takes two ePC bitmap values and returns a value representing the logical value TRUE if the bitmap values represent the same set of ePCs and otherwise returns a value representing FALSE.
6. ePC bitmap value assignment: a source ePC bitmap value is assigned to a target ePC bitmap variable such as the value of an ePC bitmap field. At the end of the operation, the target has the source's value and class.

The operations work as described in the general discussion of bitmap operations. Where mapping specifiers specify ranges of suffix values, the operation may change the ranges as required to provide a result bitmap value which represents the entire result set of ePCs. In operations which convert a set of ePCs to an ePC bitmap value or modify the set of ePCs contained in an ePC bitmap value, the operation may include a parameter which specifies the number of bits in the ePCs which are to be considered prefix bits.

Applications of ePC Bitmap Values

Reducing the Bandwidth Required to Transfer Lists of ePCs Across a Network

Figure 9:
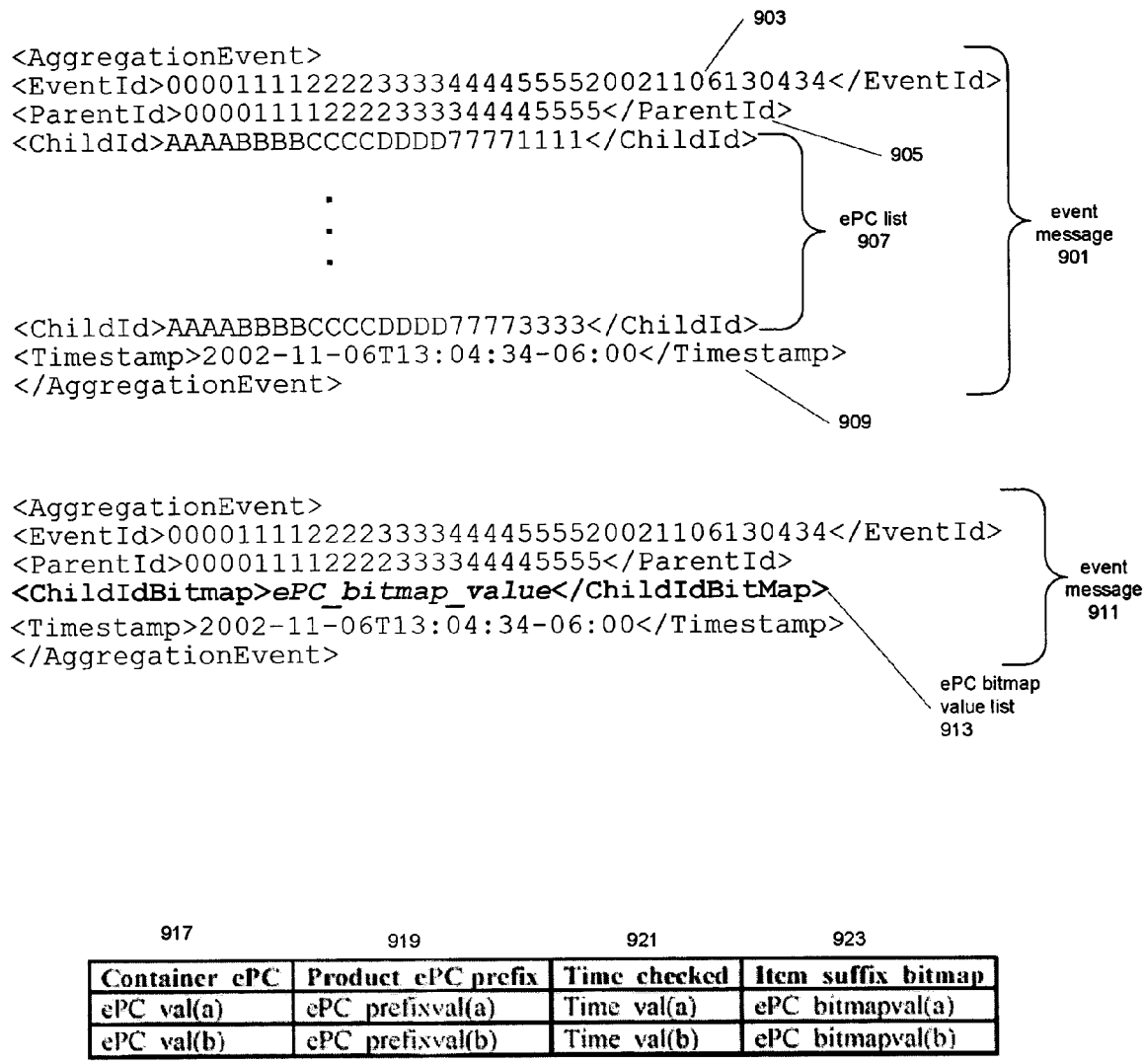
FIG. 9 shows an aggregation event message that includes an ePC bitmap value and a database table that includes ePC bitmap values.

Inventory tracking with ePCs will be done with tracking devices that keep track of the ePCs of product items currently in a container such as a store shelf. The tracking devices will periodically send aggregation event messages indicating what product items are currently in the container to a central inventory database. Such messages are a species of event message in the inventory tracking system. FIG. 9 shows such an aggregation event message 901. The message is in XML. Message components are bounded by <component_name> . . . </component_name> and components may contain nested components. Event message 901 is an AggregationEvent. The next component of the message is an identifier 903 for the event. Then comes the identifier for the container which is the source of the event message. Next comes a list 907 of the ePCs for the product items currently in the container. Next comes a time stamp 909 indicating the time at which the list of ePCs was made.

When the container is any size at all, the list of the ePC's in the container becomes very long. With most inventory control being done with ePC's, the number of messages like message 901 becomes very large and presents a serious burden to the network that carries the message. Event message 911 shows how ePC bitmap values can be used to reduce the size of event messages involving lists of ePC's. As shown at 913, the list of ePCs 907 is replaced with a list of ePC bitmap values 913. Each item on the list has an ePC bitmap value with a mapping specifier that includes the ePC prefix 811 for one or more items in the container. The bits in the bitstring representation that correspond to the suffixes belonging to the items of the kind specified by the ePC prefix 811 are set. If all of the items in the container have the same prefix, there will be a single entry in ePC bitmap value list 913. Otherwise, there will be an entry for each ePC prefix for which there are items in the container.

Using ePC Bitmap Values in Database Management System Tables

In many cases, the aggregation event messages will be sent to central locations which use database management systems to keep track of inventory. ePC bitmap values can be used in tables in those central locations both to reduce the size of the tables and to speed the performance of many useful operations on ePCs. An example of such a table, InventoryTable 915 is shown in FIG. 9. The DDL that creates the table may look like this:

```
CREATE TABLE InventoryTable
    (Container_EPC      RAW(12),
    Product_EPC_prefix  RAW(12),
    Time_checked        TIMESTAMP,
    Item_suffix_bitmap  EPC96BITMAP);
```

The table has four columns: Container_EPC 917, which contains an ePC for a container whose inventory is being controlled, Product_EPC_prefix 919, which is the object class 807 for ePCs representing items of a particular kind of product, Time_checked 921, which indicates when the products in the container indicated by field 917 that are of the kind indicated by field 919 were last checked, and Item_suffix_bitmap 923, which contains an ePC bitmap value that indicates which items of the products indicated by field 919 were in the container indicated by field 917 at the time indicated by field 921. As indicated by the type declaration for Item_suffix_bitmap, the sets of ePCs represented by the bitmap values contain 96-bit ePCs.

There are many ways in which the ePC bitmap operations can be used in table 915. For example, to find out how many items there are of a particular kind of product in a particular container, one could use the EPC_BITMAP2COUNT function like this:

```
item_count:= EPC_BITMAP962COUNT(TO_SET(
    SELECT Item_suffix_bitmap
    FROM InventoryTable
    WHERE (Container_EPC = container) AND
        (Product_EPC_prefix = prod_prefix)));
```

Where inventory information is coming in via aggregation event messages 911, the inventory table row for a particular container and product can be updated simply by assigning the aggregation message's time stamp to field 921 and its ePC bitmap for the particular container and product to field 923. In the course of updating, the bitmap logical operations can be used to detect changes between the old bitmap value of field 923 and the bitmap received in the aggregation event message. If the old bitmap value and the received bitmap value are XORed and the result bitstring has all "0" bits, there has been no change in the product items on the shelf. XOR can thus be used to implement the EQUALS operation. EPC_BITMAP_OR can be used to sum the items of a product over the entire table and the COUNT function could be applied to the result of the summing OR operation to find the total number of the items present in the containers which have entries in the table. EPC_BITMAP_MINUS can be used to detect insertion and deletion of items. EPC_BITMAP_EXISTS can be used in queries to find what container an item indicated by a particular ePC is located in.

With aggregation event messages that contain lists of ePC's, the lists could be sorted by prefix and EPCS2EPC_BITMAP used to set field 923 for the container and product. Similarly, if the system that contained table 915 needed to provide a list of the ePC's for the items of a particular product in a particular container, it could do so by applying EPC_BITMAP2EPCS to field 923 for the container and product. If the aggregation event message reports simply the ePCs of items removed from the container or the ePCs of items added to the container, EPC_BITMAP_DELETE and EPC_BITMAP_INSERT can be used to update the bitmap values in field 923.

User-Defined Bitmap Data Types

As already pointed out, rowid bitmap values can represent any set of objects which it makes sense to store in one or more columns of a database table. There is thus no need for a user-defined bitmap data type that represents sets of objects stored in a database system. User-defined bitmap data types may, however be useful where the objects represented by the bitmap values are external to the database system. As previously set forth, all that is required for such a bitmap data type is an ordered set of identifiers. Other embodiments of the invention may permit the user to define a set of identifiers in the database system and a bitmap data type based on the set of identifiers. The definition of the bitmap data type would involve defining the mapping specifier for the bitmap data type, defining the bit string representation for the data type, and the semantics of the operations on values of the bitmap data type.

Making Indexes Based on Bitmap Values

Using Bitmap Values in Queries

With bitmap values stored in a column of a table, a common query is to determine rows of the table in which the bitmaps indicate the presence or absence of an object in the set of objects represented by the bitmap. Two functions are available for determining whether an object is present or absent:
  1. bmapExists( ): which determines the existence of an object in the set of objects specified by the bitmap. The function is passed a bitmap as the first argument and an identifier for the object as the second argument and returns 1 if the bitmap specifies that the object identified by the identifier belongs to the set of objects specified by the bitmap and otherwise 0.
  2. bmapNotExists( ): which determines the absence of an object from the set of objects specified by the bitmap. The function is passed a bitmap as the first argument and an identifier for the object as the second argument and returns 1 if the bitmap specifies that the object identified by the identifier does not belong to the set of objects specified by the bitmap and otherwise 0.

With these functions, the SQL for a query on a table including bitmap values which returned all of the rows whose bitmap values indicated that the set represented by the bitmap value contained a given ePC would look like:
  SELECT *
    FROM bmapTable
    WHERE bmapExists(bmapvalue, <epcI>)=1;

In a query for the absence of an identifier, bmapExists would be replaced by bmapNotExists.

Tables Containing Bitmap Values: FIG. 11

The storing of bitmap values in one or more columns of a table means that a query that involves the bitmap values is subject to performance degradation as the number of entries in the table increases. For example, the search for a given ePC may require that every bitmap in the table be searched to see whether the bit representing the ePC is set in the bitmap. FIG. 11 shows a table containing ePC bitmap values, all of which have the same mapping specifier. Shelf_Inventory 1101 is a table containing scalar field shelf_id 1103, Time 1105 containing a scalar value indicating time, map 1106, specifying the mapping specifiers for the ePC bitmaps, and EPC_bitmap 1107, a column of bitmap values, all of which have the mapping specifier nnn. Rowids 1109 represent the logical location of data within table Shelf_Inventory 1101. In order to find all occurrences of the ePC which is represented by the twelfth bit in the bitmap (0000 0000 0001 0000), on Shelf 1, it is necessary to read all 16 elements corresponding to Shelf 1 of the table. What is needed is an index that can summarize the contents of a column of bitmap values such that fewer than 16 rows need to be examined to complete the query.

Figure 12:
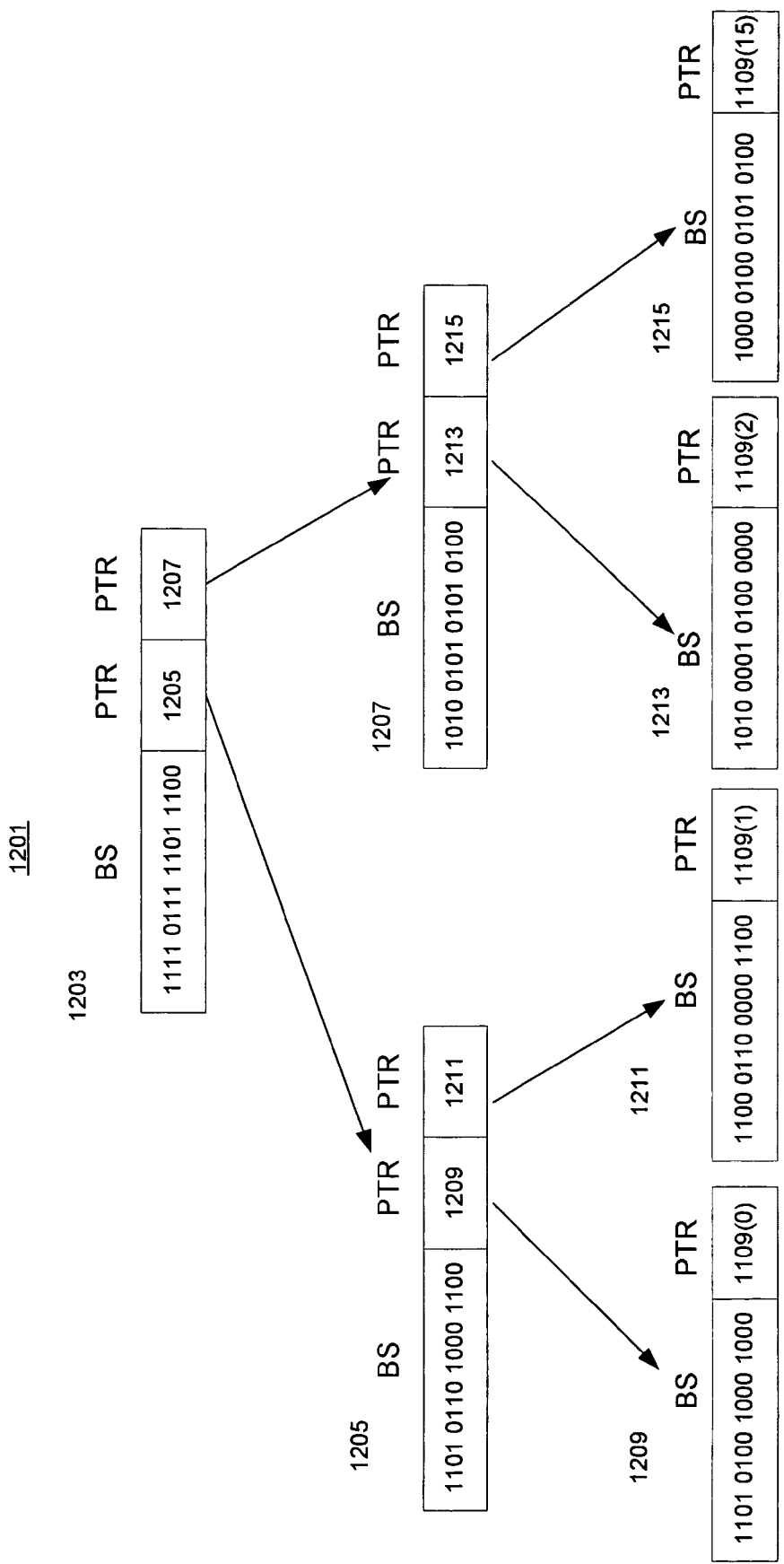
FIG. 12 is a detailed representation of a bitmap index that uses summary bit map values.

An Index Using Summary Bitmaps: FIG. 12

FIG. 12 shows an example index 1201 for locating the bitmap values contained in rows 0, 1, 2, and 15 of table 1101. A full index of table 1101 would of course index every row of the table. Index 1201 uses summary bitmap values to speed up the search for a particular bitmap value. Index 1201 is a tree structure made up of nodes 1203-1215. Each node has bitmap value BS and one or two pointers PTR. There are two kinds of nodes in the index, leaf nodes and internal nodes. The leaf nodes are nodes 1209-1215. In the leaf nodes, bitmap value BS is a bitmap value that is indexed by the leaf node and single pointer 1109 points to the row in table 1101 that contains the bitmap value. In the internal nodes, there are two pointers, the pointers point to other nodes in the index, and the bit maps are summary bit maps. The single topmost internal node 1203 is termed the root of tree structure 1201. The other internal nodes are termed branch nodes.

A summary bitmap is a bitmap value whose values are determined by an aggregation operation on a set of other bitmap values. In this context, an aggregation operation is simply any operation that produces a bit value based on the value of two or more other bitmap values. Examples of aggregation operations are AND and OR. In the case of index 1201, the set of other bitmap values are the bitmap values which are in the nodes which are descendants of the node containing the summary bitmap. Thus, node 1205 has two descendants, nodes 1209 and 1211 and bit string BS in node 1205 is the OR of the bit strings BS in nodes 1209 and 1211. Similarly, root node 1203 has summary bit string BS which is the OR of the bit strings BS in all of its descendant nodes 1205 through 1215.

In FIG. 12, each node, either root, branch, or leaf, shows only one or two PTR fields to branch nodes, leaf nodes, or rows of the target table, but in an actual implementation the number of members of the set of PTR fields may be greater. The effect of building a summary bitmap is that the search is shortened because fewer than 16 rows are examined to locate the target data. While summary bitmap tree 1201 is shown logically, in an actual implementation, each PTR field in the internal nodes is a reference in to another row in the table that the index is stored in. In a preferred embodiment, summary bitmap index tree 1201 is an index object in a relational database system and is automatically updated by the relational database system when the table that the index indexes changes. In the preferred embodiment, summary bitmap index tree 1201 is implemented as a user-defined index.

The query to locate a record with the ePC corresponding to the twelfth bit in a bitmap value would look like:

```
SELECT *
    FROM Shelf_Inventory
        WHERE bmapExists( EPC_bitmap, <epc1>)=1;
    where <epc1> corresponds to the twelfth ePC in the 16 ePC range
    represented by the bitmap.
```

If summary bitmaps are available in an index 1201, summary bitmap BS in Root node 1203 is examined to determine whether the twelfth bit is set. When that test resolves to true, the summary bit maps in both branch nodes 1205 and 1207 are examined; when the test resolves to true for branch node 1207, leaf nodes 1213 and 1215 are examined. When the test resolves to true for leaf node 1215, row 1109(15) is fetched from the table the index belongs to and the result returned by the query. Of course, the twelfth bit may be set in more than one of the leaf nodes, and in that case, the row 1109 corresponding to each leaf node in which the twelfth bit is set is fetched.

It should be noted here that a summary bitmap index is only helpful when the bitmap in question is present in a fraction of the rows in the table (less than 100%) (This would be the case in practice). However, note that if the EPC is present in all rows, then every node of the index tree will be traversed, and performance will be worse than without the summary index. The threshold at which a full table scan with function evaluation becomes better than the use of a summary bitmap index is an area for future research.

Summary Bitmap Search Pseudocode: FIG. 13

FIG. 13 shows pseudocode for searching summary bitmaps. Pseudocode 1301 shows a function DFS 1303 (standing for Depth-First Search) that is passed two arguments. Argument X 1305 is a node in the tree. Argument epc 1307 is the ePC value that is being searched for. Function bmp 1309 returns a bitmap for a given node. At line 1313 a bitmap is extracted from a node X and the function bmapExists determines if the ePC is one of the ePCs that the bitmap indicates as being present in the set represented by the bitmap. If it is (1315) then if the node is a leaf node 1317, then indicate that the epc is present(1319). If the node is not a leaf node (1321-1333) then for each child node of the current node 1325, call the function DFS to test the children for the presence of an ePC in the set of ePCs represented by the bitmap 1329. Stop processing the current node and return (1335).

Figure 14:
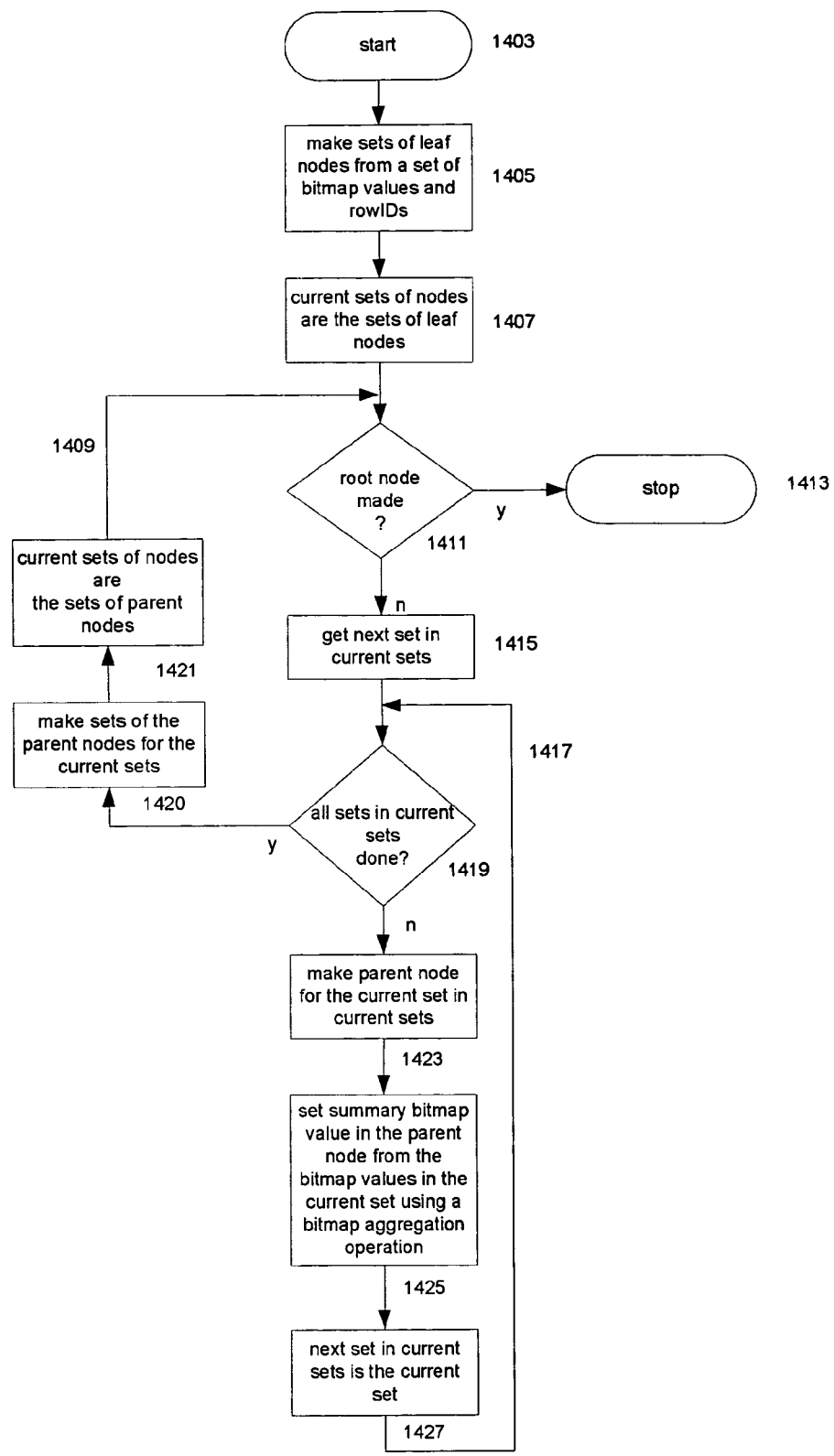
FIG. 14 is a flowchart showing how an index that uses summary bit map values may be constructed.

Building Indexes with Summary Bitmaps: FIG. 14

FIG. 14 is a flowchart 1401 that describes how an index that uses summary bitmaps may be constructed. The index is a tree, that is, there is a single path in the tree from each leaf node through the tree to the root node. Beginning with start 1403, the first step (1405) is to make sets of leaf nodes from a set of bitmap values and rowIDs from the table being indexed. All of the leaf nodes in a given set will be children of a single parent node at the next level, so the size of the sets of leaf nodes is determined by the number of children the parent node may have. The number of sets of leaf nodes in turn determines the number of levels in the tree. The current sets of nodes being processed are the sets of leaf nodes (1407). The remaining processing consists of two loops, one, 1417, which processes each set of nodes in the current set, and one, 1409, which processes nodes at each level of the index in turn until the index's root node is processed.

Decision block 1411 determines whether the root node has been processed; if it has been, processing stops (1413). If not, the next set of nodes in the current sets of nodes is processed (1415). Decision box 1419 determines whether all of the sets of nodes in the current sets of nodes have been processed; if not, processing of the sets in the current sets continues in loop 1417; if so, loop 1409 is iterated; Processing of the nodes at the next higher level of the index begins with the division of the parent nodes for the current sets of nodes into sets (1420) and continues with making the sets of parent nodes into the current sets of nodes.

Processing of the current set in loop 1417 is as follows: first a parent node is made for the current set (1423); then the summary bit map value in the parent node is set from the bitmap values in the current set using a bitmap aggregation operation (1425). Then the next set in the current sets becomes the current set (1427) and loop 1417 is iterated.

Creating a Summary Bitmap Index with More than One Predicate

Once the basic summary bitmap index is built, a summary bitmap index that speeds up more complex queries can be built. Consider the following query:

```
SELECT shelf_id, time
    FROM Shelf_Inventory
    WHERE bmapExists(item_bmap, <epc1>) = 1
    AND time > <time1>;
```

The query would still be required to read each entry in the table to evaluate the scalar value time. To remedy this problem, an index is created in which a separate index is created for each scalar value. To do this, the algorithm of flowchart 1401 is used, with the sets of leaf nodes being leaf nodes made from rows of the table being indexed which have the same scalar time value. Following these steps creates a tree structure. In a database system this tree structure is stored internally as a table within the database system. Table 1111 in FIG. 11 shows a table that contains an index made according to this method. The table has four columns. RowId 1113 is a row id for each row of the table. Time field 1115 contains a scalar time value. Summary_bitmap field 1117 contains a summary bitmap made by the steps of the method above.

Reference field 1119 contains either a reference to rows of index table 1111 table or a reference to rows of the table 1101. RowIds 0-3 represent root nodes, one root node for each scalar value. RowIds 4-15 represent leaf nodes. Each of the leaf nodes has a reference to a row of another table (not shown). In table 1111, each of these references has the prefix X.

Where the number of different scalar values is large, another method of creating an index of summary bitmaps can be chosen. If a table has 40 different time values, for example, then 40 summary bitmap indexes would be required to support the table. A more efficient process would be to break the scalar values into ranges of values and then build an index for each range. The technique is the same as for creating an index for individual scalar values except that a range of scalar values is used to define the set of rows for which the index is being created.

Table 1121 in FIG. 11 shows the root nodes of an index table made using this method. Each of the values in field time_range 1123 is a range of scalar time values. Rows of index nodes pointed to by the root node are stored in the column rowIDs 1127. Summary_bitmap field 1125 in each root node contains a summary bitmap made from all the bitmap values in the rows of table 1101 whose time values belong to the range specified in Time_range field 1123 of the root node. Other internal nodes and the leaf nodes would be stored in additional records of table 1121. It should be pointed out here that the techniques just described with regard to time values can be applied to any set of scalar values and the techniques described with regard to ranges of time values can be applied to any ordered set of scalar values. In particular, the techniques may be applied to the mapping specifiers for the bitmap values, with individual mapping specifiers being treated like other scalar values and ranges of mapping specifiers being treated like ranges of other scalar values. For example, in the ePC context, the mapping specifier for a particular product could be used to make an index on all of the bitmaps in a table that specified ePCs for that product. A range of mapping specifiers that specified a class of products could similarly be used to make an index on all of the bitmaps in the table that specified ePCs for the class of products.

Querying for the Lack of an Object in the Set of Objects Defined by Bitmap Values Often queries search for the lack of a value. The summary bitmap indexes described above lend themselves well to quickly determining whether an object belongs to the set of objects specified by a bitmap value but would not work with a query that attempted to determine that an object did not belong to the set of objects specified by a bitmap value. The following is such a query:

```
SELECT shelf_id, time
    FROM Shelf_Inventory
    WHERE bmapNotExists(item_bmap,<epc1>) = 1
    AND time > <time1>;
```

The methodology for creating a summary bitmap index that accelerates this type of query is the same as that just discussed except that the aggregation operation used to make the summary bitmap values is AND instead of OR. Once a summary bitmap has been created, the search is the same as that shown in pseudocode 1301 except that the function called in the test at line 1313 would be bmapNotExists rather than bmapExists.

CONCLUSION

The foregoing Detailed Description has disclosed to those skilled in the relevant technologies how to make and use the indexes of the invention and has further disclosed the best modes presently known to the inventors of so doing. It will be immediately apparent that many variations on the techniques disclosed herein are possible. To begin with, summary bitmap values may be used in any hierarchical index structure and may be constructed using any bit operation which aggregates bit values. Further, in the bitmap values disclosed herein, the presence of an object in the set represented by the bitmap value is marked by setting a bit in the bitstring to 1; otherwise, the bit is set to 0; in some embodiments, this may be reversed, with the bit being set to 0 if the object is present and otherwise to 1. Additionally, the objects indexed by the indexes may be rows of database tables, as disclosed herein, but may also be any object that includes a bitmap value. The references used in the index to refer to the objects will of course depend on the kind of object. Finally, the indexes may be represented by rows in tables, as disclosed herein, or by any other data structure which permits representation of a node of a tree. The references used in the index to refer to other nodes will of course depend on the kind of data structure used to implement the index. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. An index tree, the index tree being stored in a medium accessible to a processor and being manipulatable by the processor,
    the index tree comprising:
        a plurality of first nodes at a level of the tree, each first node containing a bitmap value that represents a subset of a set of objects; and a second node at a next higher level of the tree, the second node being a parent of the plurality of first nodes and containing a summary bitmap value determined by a logical operation on bits of the bitmap values contained in the plurality of first nodes that are descendants of the second node.

2. The index tree set forth in claim 1, wherein:
the logical operation is a logical OR of corresponding bits of the bitmap values contained in the plurality of first nodes that are descendants of the second node.

3. The index tree set forth in claim 1, wherein:
the logical operation is a logical AND of corresponding bits of the bitmap values contained in the plurality of first nodes that are descendants of the second node.

4. The index tree set forth in claim 1 wherein:
the second node is the root node of the index tree.

5. The index tree set forth in claim 1 wherein:
the index tree indexes a set of objects that contain bitmap values;
the first nodes are leaf nodes of the index tree; and
each first node's bitmap value is a copy of a bitmap value contained in an object of the set thereof; and
each first node further specifies the object that contains the bitmap value whose copy is in the first node.

6. The index tree set forth in claim 5 wherein:
the logical operation is a logical OR operation; and
a set bit in the second node's summary bit map indicates that there exists at least one bitmap in the second node's descendant leaf nodes in which the bit corresponding to the set bit is set.

7. The index tree set forth in claim 5 wherein:
the logical operation is a logical AND operation: and
when a bit is not set in the second node's summary bit map, the unset bit indicates that there is at least one bitmap in the second node's descendant leaf nodes in which the bit corresponding to the unset bit in the second node's summary bit map is unset.

8. The index tree set forth in claim 5, wherein:
each object contains a scalar value in addition to the bitmap value; and
the index tree indexes a subset of the objects wherein all of the objects have equal scalar values.

9. The index tree set forth in claim 5, wherein:
each object contains a scalar value in addition to the bitmap value; and
the index tree indexes a subset of the objects, the objects in the indexed subset having scalar values belonging to a particular range of the scalar values.

10. The index tree set forth in claim 5, wherein:
the set of objects is rows in a table in a relational database system.

11. The index tree set forth in claim 10, wherein:
the index tree is an index object for the table in a relational database system.

12. The index tree set forth in claim 1, wherein:
the index tree is an index object in a relational database system.

13. The index tree set forth in claim 1, wherein:
the first nodes are leaf nodes of the index tree;
there is a plurality of next higher levels in the index tree; and
the summary bitmap value of a given node at a given higher level of the index tree is determined by the logical operation on the bitmap values contained in all of the nodes that are descendants of the given node.

14. The index tree set forth in claim 13, wherein:
the next higher levels of the tree include a highest level containing the root node of the index tree.

15. A storage medium that is readable by a processor,
the storage medium being characterized in that:
the storage medium contains the index tree set forth in claim 1.

16. A method of making an index tree, the index tree being stored in a medium accessible to a processor, the method being performed by the processor and
the method comprising the steps of:
making a plurality of first nodes at a level of the tree, each first node containing a bitmap value that represents a subset of a set of objects; and
making a second node at a next higher level of the tree, the second node being a parent of the nodes in the plurality of first nodes and containing a summary bitmap value determined by a logical operation on bits of the bitmap values contained in the plurality of first nodes that are descendants of the second node.

17. The method set forth in claim 16, wherein:
the logical operation is a logical OR of corresponding bits of the bitmap values contained in the plurality of first nodes that are descendents of the second node.

18. The method set forth in claim 16, wherein:
the logical operation is a logical AND of corresponding bits of the bitmap values contained in the plurality of first nodes that are descendants of the second node.

19. The method of making an index tree set forth in claim 16 further comprising the step of:
dividing the plurality of first nodes into one or more disjunct sets thereof; and
in the step of making a second node, making a second node for each of the disjunct sets, the second node corresponding to a disjunct set being a parent of the nodes in the corresponding disjunct set.

20. The method set forth in claim 19, wherein:
beginning with the index tree's leaf nodes as the first nodes, the steps of the method are repeated at each next higher level of the index tree until the parent node is the root node.

21. The method set forth in claim 16, wherein:
the index tree indexes a set of objects that contain bitmap values;
the first nodes are leaf nodes of the index tree; and
each first node's bitmap value is a copy of a bitmap value contained in an object of the set thereof; and
each first node further specifies the object that contains the bitmap value whose copy is in the first node.

22. The method set forth in claim 21, wherein:
the objects of the set of objects contain a scalar value in addition to the bitmap value; and
the index tree indexes a subset of the objects wherein all of the objects have equal scalar values.

23. The method set forth in claim 21, wherein:
each object contains a scalar value in addition to the bitmap value; and
the index tree indexes a subset of the objects, the objects in the indexed subset having scalar values belonging to a particular range of the scalar values.

24. The method set forth in claim 21 wherein:
the processor is executing code for a relational database management system;
the set of objects is rows in a table in the relational database system; and
the index tree is an index object for the table in the relational database management system.

25. The method set forth in claim 16 wherein:
the processor is executing code for a relational database management system; and
the index tree is an index object in the relational database management system.

26. A storage medium that is readable by a processor,
the storage medium being characterized in that:
the storage medium includes a program which, when executed by the processor, causes the processor to perform the steps set forth in claim 16.

27. A method of traversing an index tree that is stored in a storage medium, the index tree having leaf nodes which are not parent nodes of child nodes and internal nodes which are parent nodes of child nodes, the child nodes being leaf nodes or other internal nodes, each parent node of the index tree containing a summary bitmap, each leaf node of the index tree containing a bitmap value that represents a subset of a set of objects, the method being performed in a processor which has access to the storage medium and has been programmed to perform the method, and the method comprising the steps of:
(1) obtaining a summary bitmap contained in a parent node of the index tree, the summary bitmap in the parent node being determined by a logical operation on bits of the bitmap values contained in child nodes of the parent node, and determining whether a given bit of the parent node's summary bitmap is set to a value that indicates that an object is present in a set of objects represented by the parent node's child nodes;
(2) when the given bit is set to the value that indicates that an object is present in the set of objects represented by the parent node's child nodes and the child nodes are internal nodes, performing step (1) in each of the parent's child nodes; and
(3) continuing to perform steps (1) and (2) as long as the child nodes are internal nodes and as long as the given bit in the child node's summary bit map is set to the value that indicates that the object is present in a set of objects represented by the child node's child nodes.

28. The method set forth in claim 27 wherein
the index tree's leaf nodes include bitmaps which have bits corresponding to the bits of the summary bit maps; and
the method further comprises the step performed when the child node is a leaf node of:
determining the value of the bit in the leaf node's bitmap that corresponds to the given bit.

29. The method set forth in claim 28 wherein:
the value of the bit in the leaf node's bitmap indicates whether a given object of the set of objects is present in the subset.

30. The method set forth in claim 29 wherein
the leaf node further includes an identifier for another object; and
the method further includes the step of:
depending on whether the given object is present in the set, returning the identifier for the other object.

31. The method set forth in claim 30 wherein
the summary bitmaps are made using a logical OR operation; and
the step of determining determines whether the bit in the leaf node's bitmap that corresponds to the given bit is set to indicate the presence of the given object in the set; and
when the bit in the leaf node's bitmap is so set, the step of returning the identifier returns the identifier for the other object.

32. The method set forth in claim 30 wherein:
the summary bitmaps are made using a logical AND operation; and
the step of determining determines whether the bit in the leaf node's bitmap that corresponds to the given bit is set to indicate the non-presence of the given object in the set; and
when the bit in the leaf node's map is so set, the step of returning the identifier returns the identifier for the other object.

33. The method set forth in claim 30 wherein:
the index tree is an index object in a relational database management system that indexes a table in the relational database management system;
the other object is a row in the table indexed by the index tree; and
the bitmap in the leaf node is a copy of a bitmap that is included in the row.

34. A storage medium that is readable by a processor,
the storage medium being characterized in that:
the storage medium contains code which, when executed by the processor, causes the processor to perform the method set forth in claim 27.

* * * * *

UNITED STATES PATENT AND TRADEMARK OFFICE
CERTIFICATE OF CORRECTION

PATENT NO. : 7,774,346 B2  Page 1 of 1
APPLICATION NO. : 11/215639
DATED : August 10, 2010
INVENTOR(S) : Ying Hu et al.

It is certified that error appears in the above-identified patent and that said Letters Patent is hereby corrected as shown below:

On sheet 11 of 14, in Figure 11, line 1, above "1106" insert -- 1101 --.

In column 14, line 66, delete "6" and insert -- 64 --, therefor.

Signed and Sealed this
Twenty-fourth Day of May, 2011

David J. Kappos
*Director of the United States Patent and Trademark Office*